(12) United States Patent
Clarkson et al.

(10) Patent No.: US 7,879,388 B2
(45) Date of Patent: Feb. 1, 2011

(54) METHODS FOR PRODUCTION AND USE OF SYNTHETIC HYDROXYAPATITE AND FLUORAPATITE NANORODS, AND SUPERSTRUCTURES ASSEMBLED FROM THE SAME

(75) Inventors: Brian H. Clarkson, Ann Arbor, MI (US); Haifeng Chen, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 652 days.

(21) Appl. No.: 11/665,529

(22) PCT Filed: Oct. 28, 2005

(86) PCT No.: PCT/US2005/039492

§ 371 (c)(1),
(2), (4) Date: Nov. 9, 2007

(87) PCT Pub. No.: WO2006/050365

PCT Pub. Date: May 11, 2006

(65) Prior Publication Data

US 2008/0220148 A1 Sep. 11, 2008

Related U.S. Application Data

(60) Provisional application No. 60/622,897, filed on Oct. 28, 2004.

(51) Int. Cl.
*A61L 27/32* (2006.01)
*C01B 25/32* (2006.01)

(52) U.S. Cl. .................. 427/2.27; 423/301; 423/308; 423/309

(58) Field of Classification Search .................. 423/308, 423/309, 301; 427/2.27
See application file for complete search history.

(56) References Cited

U.S. PATENT DOCUMENTS 5,486,365 A 1/1996 Takado et al.
5,652,056 A 7/1997 Pepin (Continued)

FOREIGN PATENT DOCUMENTS

JP 59-207818 11/1984

OTHER PUBLICATIONS

Jingbing Liu et al, "Rapid formation of hydroxyapatite nanostructures by microwave irradiation", Chemical Physics Letters, 396 (4-6), 429-432 (2004). (no month).*

(Continued)

*Primary Examiner*—Wayne Langel
(74) *Attorney, Agent, or Firm*—Marshall, Gerstein & Borun LLP

(57) ABSTRACT

Disclosed herein are methods directed toward the synthesis of ordered structures of hydroxyapatite and hydroxyapatite derivatives. More specifically, disclosed herein is a method of preparing ordered hydroxyapatite nanorod structures including the steps of suspending calcium and phosphate in a solvent, adjusting the pH to above 5, and heating to a temperature sufficient to support formation of the ordered hydroxyapatite nanorod structures. In some cases, the methods may include ethylenediamine tetraacetic acid or ethylenediamine tetraacetic acid derivatives. Also disclosed are methods that additionally involve a step of coating hydroxyapatite nanorods with a protein or an amphiphile such as a surfactant or polymer.

33 Claims, 16 Drawing Sheets

U.S. PATENT DOCUMENTS

| | | | |
|---|---|---|---|
| 5,895,641 | A | 4/1999 | Usen et al. |
| 6,146,686 | A | 11/2000 | Leitao |
| 6,207,218 | B1 * | 3/2001 | Layrolle et al. ............ 427/2.27 |
| 6,440,394 | B2 | 8/2002 | Barth et al. |
| 6,482,395 | B1 | 11/2002 | Barth et al. |
| 7,416,564 | B2 * | 8/2008 | Kim et al. ................ 623/23.56 |
| 2002/0037258 | A1 | 3/2002 | Dodd et al. |
| 2003/0219466 | A1 | 11/2003 | Kumta et al. |
| 2004/0086467 | A1 | 5/2004 | Curro |
| 2005/0031704 | A1 | 2/2005 | Ahn |
| 2007/0059257 | A1 | 3/2007 | Estrada et al. |
| 2007/0258916 | A1 | 11/2007 | Ferracane et al. |
| 2008/0003542 | A1 | 1/2008 | Jin et al. |
| 2008/0206554 | A1 * | 8/2008 | Riman et al. ................ 428/330 |

OTHER PUBLICATIONS

M. M L. Montero et al, "Chemically-induced nucleation of hydroxyapatite at low temperature", Journal of Materials Science, 39 (1), 339-341 (2004). (no month).*

A. Saenz et al, "Silica-Hydroxyapatite Nanometric Composites Grown at Boiling Water Temperature", Surface Review and Letters, 9 (5&6), 1799-1802 (2002). (no month).*

A. Saenz et al, "Preparation of Silica-Hydroxyapatite Nanometric Composites", Physica Status Solidi B: Basic Research, 230 (2), 347-350 (2002). (no month).*

Chen et al., "Direct Synthesis of Fluorapatite Nanorod Dental Enamel-like Structure via a Hydrothermal Method", pp. 1-15.

Chen et al., "Fluorapatite Nanorod Synthesis and the Production of Nanorod Films", pp. 1-16 (submitted to Journal of Dental Research, 2005).

Chen et al., "Self-assembly of synthetic hydroxyapatite nanorods into an enamel prism-like structure", *Journal of Colloid and Interface Science*, 288:97-103 (2005).

Kim et al., "Langmuir-Blodgett Nanorod Assembly," *J. Am. Chem. Soc.*, 123:4360-4361 (2001).

International Preliminary Report on Patentability for International Application No. PCT/US2005/039492, dated May 1, 2007.

International Search Report for Application No. PCT/US2005/039492 dated Sep. 11, 2006.

Written Opinion for Application No. PCT/US2005/039492 dated Sep. 11, 2006.

* cited by examiner

METHODS FOR PRODUCTION AND USE OF SYNTHETIC HYDROXYAPATITE AND FLUORAPATITE NANORODS, AND SUPERSTRUCTURES ASSEMBLED FROM THE SAME

STATEMENT REGARDING FEDERALLY SPONSORED RESEARCH OR DEVELOPMENT

This invention was made with government support under Contracts Nos.: DE121899, DE015599, and DMR-9871177 awarded by the National Institutes of Health and the National Science Foundation, respectively. The government has certain rights in the invention.

BACKGROUND OF THE DISCLOSURE

1. Field of the Disclosure

The present disclosure relates to synthetic enamel and bone. In particular, the present disclosure is directed to the production of ordered structures of hydroxyapatite and/or fluorapatite nanorods.

2. Related Technology

Dental enamel is the outermost layer of the teeth. The fully developed mature dental enamel is made of enamel prisms, highly organized micro-architectural units, which consist of bundles of nanorod-like calcium hydroxyapatite (HA) crystals arranged roughly parallel to each other. This structure spans the entire enamel thickness and is likely to play an important role in determining the unique physico-chemical properties of the enamel.

Dental caries is a widespread, chronic, infectious disease experienced by almost 80% of children in the US by the age of 18 and by more than 90% of adults. Such a phenomenon is not restricted to the U.S., and has spread beyond all national boundaries. Caries is, in fact, considered to have a multifactorial etiology. The most prevalent way in which dentists treat carious tissue is to remove it surgically, resulting in an extensive cavity and loss of structural integrity of the tooth. The current standard of care for carious lesions in the dentin is invasive operative treatment. This means removal of all carious dentin (removal of all diseased tissue) and replacement by a restoration to restore form, function, and integrity of the tooth. The greater number of replacement rather than new restorations also suggests that existing techniques have only limited success and that there will be an ongoing need for restoration of carious lesions, whether primary or secondary in nature. This operative treatment option is time-consuming to both dentists and patients, and costly. World-wide, the placement, replacement, and repair of restorations in teeth account for anywhere from 30-70% of a dentist's activity. In order to reduce the cost of oral care to both the patient and governmental bodies, new anti-caries restorative products and materials must be developed.

Nanotechnology has been studied extensively in the past decade for the preparation of nano-scale structures with specific size, shape and physico-chemical properties. It has also created many ways to direct the assembly of nano-particles and one-dimensional nano-scale building blocks, such as nanotubes, nanowires and nanorods, into novel functional superstructures. Among them, the application of surfactants as reverse micelles or micro-emulsions for the synthesis and self-assembly of nano-scale structures has been one of the most widely adopted methods. The application of surfactants has been used to prepare and control the size and shape of nanostructures of chemical compositions, such as barium chromate, calcium phosphates, barium sulfate, cadmium selenide, gold nanorods, and tellium nanorods. These studies have been focused on the application of surfactants for making nanostructures of uniform shape and size. In some cases, these synthesized nanostructure assemblies have an ordered arrangement. For example, nanorods may be capable of self-assembly into smectic-like arrays or liquid crystalline assemblies by solvent evaporation, as described below.

Recently, attempts have been made to assemble one-dimensional nanowires and nanorods directly into organized superstructures with the assistance of surfactants. Kim et al (Kim et al., *J Am Chem Soc,* 123:4360 (2001)) explored the organization of barium chromate nanorods at the water-air interface using the Langmuir-Blodget (LB) technique. The inorganic nanorods were assembled into isotropic, nematic and smectic phases depending on the surface pressure. The same group has also applied the LB technique to assemble silver nanowires into ordered structures by rendering the nanowires hydrophobic through the use of 1-hexadecanethiol ligands.

Synthetic hydroxyapatite has been produced, the crystals of which are macro, irregular, indiscrete, a mixture of sizes and of variable composition.

SUMMARY OF THE DISCLOSURE

Disclosed herein are methods for the production of ordered hydroxyapatite structures and uses for these ordered structures.

One aspect of the disclosure provides methods for preparing ordered hydroxyapatite nanorod structures including suspending a calcium source, a phosphate source, and ethylenediamine tetraacetic acid or an ethylenediamine tetraacetic acid salt in a solvent to form a suspension, adjusting the suspension to a pH in the range of about 6 to about 11, and heating the suspension to a temperature in the range of about 25° C. to about 150° C. to support formation of the ordered hydroxyapatite nanorod structures.

In some cases, the calcium source is calcium phosphate, calcium nitrate, calcium ethylenediaminetetraacetate, calcium carbonate, calcium acetate, calcium bromide, calcium fluoride, calcium iodide, calcium chloride, calcium citrate, calcium hydroxide, calcium oxylate, calcium sulfate, calcium ethoxide, or a combination thereof. In some cases, the phosphate source is calcium phosphate, sodium phosphate, ammonium phosphate, lithium phosphate, potassium phosphate, magnesium phosphate, triethyl phosphate, or a combination thereof. In certain embodiments, the calcium source and the phosphate source are powdered hydroxyapatite.

In some embodiments, the suspension is heated under a pressure greater than 1 atm. In these and other embodiments, the solvent of the suspension is water, methanol, ethanol, nitric acid, or a combination thereof. In these and other embodiments, the pH of the suspension may be adjusted to greater than pH 8. Additionally and alternatively, the suspension may be heated to a temperature in the range of about 70° C. to about 130° C. In other embodiments, the suspension is heated for a time period in the range of about 5 minutes and about 120 hours. In some embodiments, the suspension further includes sodium fluoride, ammonium fluoride, amelogenin, enamelin, dentin phosphoprotein, collagen, and/or ameloblastin. In other cases, the suspension is exposed to carbon dioxide, e.g., atmospheric carbon dioxide. In other embodiments, the nanorods of hydroxyapatite that form the ordered structures have a diameter in the range of about 5 nm and about 5 µm and a length in the range of about 10 nm and about 200 µm.

Another aspect of the disclosed methods includes producing ordered structures having hydroxyapatite nanorods by suspending a calcium source and a phosphate source in a solvent to form a suspension, adjusting the pH of the suspension to the range of about 6 and about 11, and heating the suspension to a temperature in the range of about 25° C. to about 150° C., coating the resulting hydroxyapatite nanorods with an amphiphile, and suspending the coated hydroxyapatite nanorods on a water surface to allow the coated nanorods to coalesce into ordered hydroxyapatite nanorod structures.

In some embodiments, the amphiphile may be a surfactant or ionic polymer, e.g., docusate sodium salt. In other embodiments, the nanorods of hydroxyapatite that form the ordered structures have a diameter in the range of about 5 nm and about 5 μm and a length in the range of about 10 nm and about 200 μm.

Yet another aspect of the disclosure provides methods for producing an enamel film comprising suspending a calcium source, a phosphate source, and ethylenediamine tetraacetic acid or an ethylenediamine tetraacetic acid salt in a solvent to form a suspension, adjusting the suspension to a pH in the range of about 6 to about 11, adding a substrate to the suspension, and heating the suspension to a temperature in the range of about 25° C. to about 150° C. to support formation of an enamel film on the substrate.

In some embodiments, the substrate is a bone implant, dental implant, or dental restorative material. In some cases, the pressure of the heating step is greater than 1 atm, and, in some cases, may be above 2 atm. Additionally and alternatively, the suspension is heated to a temperature in the range of about 120° C. to about 130° C. under a pressure greater than 2 atm. In some cases, the pH is in the range of about 6 to about 8. Additionally and alternatively, the suspension further includes sodium fluoride, ammonium fluoride, amelogenin, enamelin, dentin phosphoprotein, or ameloblastin. In some cases, the methods further include the step of exposing the suspension to carbon dioxide, and in some cases, atmospheric carbon dioxide. In some embodiments, the hydroxyapatite nanorod structures include nanorods having a diameter in the range of about 5 nm and about 5 μm and a length in the range of about 10 nm and about 200 μm.

DETAILED DESCRIPTION OF PREFERRED EMBODIMENTS

Figure 1:
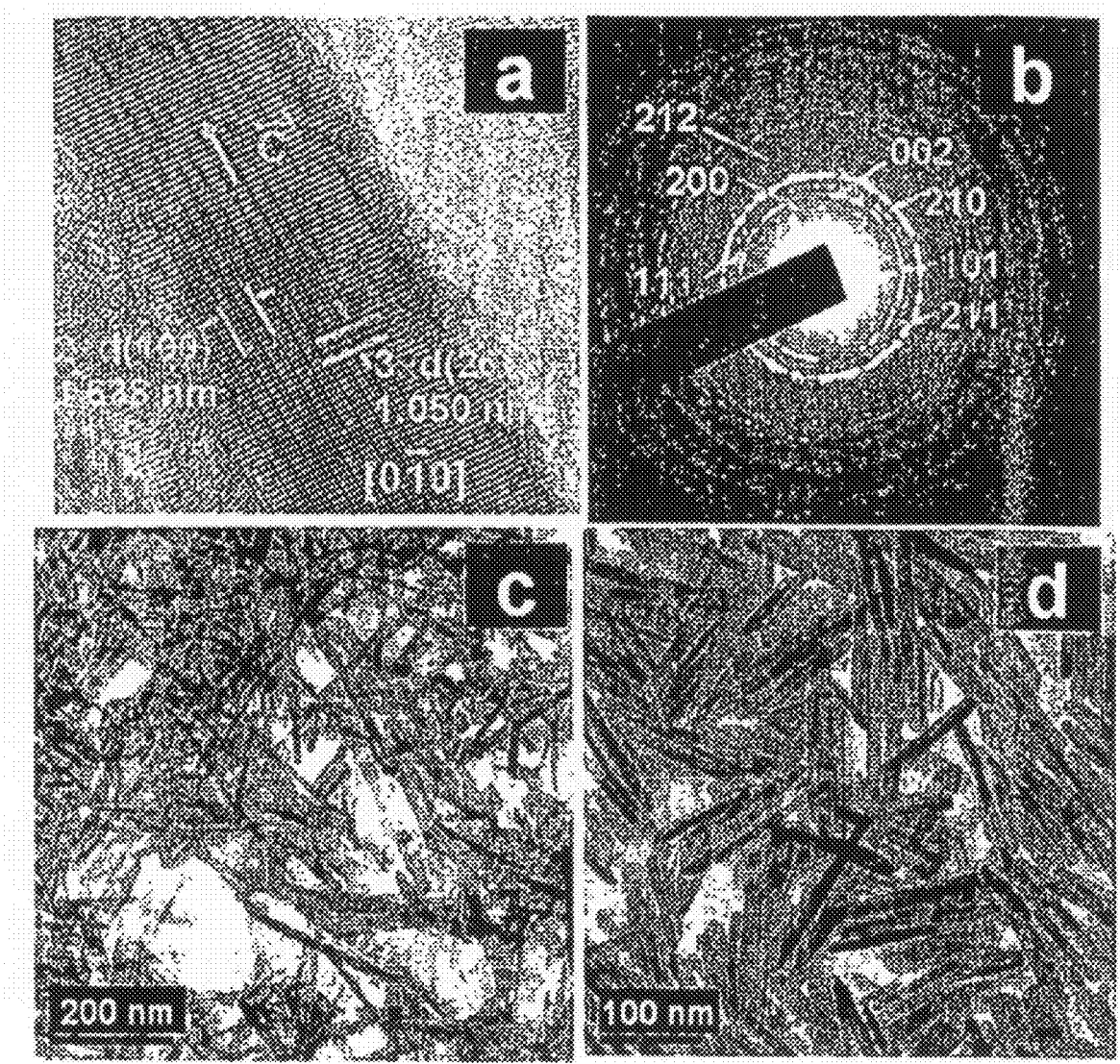
FIG. 1 shows (a): a typical HRTEM image of a synthetic HA crystal; (b): a typical SAED pattern of synthetic HA crystals where lattice planes have been indicated by arrows in the pattern; (c): a TEM image of the synthetic crystals prepared at pH 5.8, aging at 25° C. for 3 days; (d): a TEM image of the synthetic crystals prepared at pH 7.0, aging at 70° C. for 7 days.

Disclosed herein are methods of synthesizing nanorod-shaped calcium hydroxyapatite crystals, and ordered structures based on such crystals, the methods providing the capability to select or customize crystal characteristics, such as chemical composition, size and shape. Generally speaking, the disclosed methods provide the means to synthesize ordered HA nanorods and structures of these nanorods having variable characteristics which may be controlled by one or more production parameters, including the calcium source, the phosphate source, aging time, pH of the solutions, fluoride concentration of the solution, temperature, pressure, and $CO_2$. Varying the production characteristics such as chemical composition, size and shape, results in the production of structures that are similar to the structures found in enamel, dentin, cementum and bone. The ordered structures may then be used directly to form a matrix to be placed in boney areas where there has been, for example, malunion, defects, and/or where bone augmentation is desirable. These nanorods may also be introduced into scaffolds containing bone, dentin, enamel, cementum and vascular signaling molecules for the repair of the conditions mentioned above (malunions, boney defects, bone augmentation, etc.).

While the disclosed methods are particularly well suited for use in dental enamel and bone implant application, practice of the disclosed production and application methods are not limited to any such context. Rather, the disclosed methods include a number of features and functionality, as described herein below, useful in a wide range of contexts beyond those used to exemplify the methods.

Generally, the methods of producing ordered structures of HA described below include the heating of a suspension of a calcium source and a phosphate source in a solvent. The suspension may be adjusted to a suitable pH before being heated for a length of time to produce HA nanorods, optionally at an elevated pressure. In some embodiments, the suspension may include a fluoride source, a carbonate source, a protein, and/or ethylenediamine tetraacetic acid or an ethylenediamine tetraacetic acid derivative. In some cases, the surfaces of the resulting nanorods may be modified with an amphiphilic monolayer before assembly into ordered structures. In these and other cases, the ordered structures may be produced in the presence of a substrate and/or introduced into scaffolds appropriate for use in repair conditions for bone, dentin, enamel, cementum, and the like.

In accordance with some embodiments, the disclosed methods generally related to the production of medical/dental products for purposed such as tooth or bone restoration based upon incorporation of ordered structures onto a substrate. In some embodiments, such compositions are coupled with ion-releasing characteristics via, for example, the presence of fluoride and/or carbonate.

As used herein, ordered structures should be read broadly to refer to assemblies of HA nanorods. These assemblies may have a variety of architectures, including, but not limited to, sheet-like, honeycomb, sphere-like, and nanowire arrangements.

Throughout this disclosure, the terms "nanorods" and "crystals" may be used interchangeably to refer to hydroxyapatite in an arranged or controlled orientation, as compared to amorphous, powdered and/or randomly oriented hydroxyapatite.

As used herein, "hydroxyapatite" refers to $Ca_{10}(PO_4)_6(OH)_2$ and, more broadly, to hydroxyapatite derivatives; nonlimiting examples include fluorapatite (FA), carbonated hydroxyapatite, and carbonated fluorapatite.

Suspension: The methods disclosed herein include a suspension of a calcium source and a phosphate source. In some cases, the suspension may also include ethylenediamine tetraacetic acid (EDTA) or an EDTA derivative, a fluoride source, a carbonate source, and/or a substrate. The calcium source may include calcium phosphate, calcium nitrate, calcium ethylenediaminetetraacetate, calcium carbonate, calcium acetate, calcium bromide, calcium fluoride, calcium iodide, calcium chloride, calcium citrate, calcium hydroxide, calcium oxylate, calcium sulfate, calcium ethoxide, or a combination thereof. In some embodiments, the calcium source is powdered hydroxyapatite. The phosphate source may include phosphate sources include calcium phosphate, sodium phosphate, ammonium phosphate, lithium phosphate, potassium phosphate, magnesium phosphate, triethyl phosphate, or a combination thereof. In some embodiments, the phosphate source is powdered hydroxyapatite. EDTA derivatives included any salt, ester, or amide of EDTA. One or more of the acetic acid substituents may be modified in the EDTA derivative. Nonlimiting examples of contemplated salts for use in the disclosed methods include calcium, sodium, lithium, magnesium, potassium, ammonium, copper, iron, and combinations thereof. One example of a suitable salt is the calcium disodium EDTA salt (EDTA-Ca—$Na_2$). Sources of fluoride in the suspension may include ammonium fluoride, sodium fluoride, or other alkali (Group I) or alkaline earth (Group II) metal fluoride salts. Sources of carbonate may include exposure of the suspension to carbon dioxide or addition to the suspension of carbonate salts or urea. In some embodiments, the carbon dioxide is atmospheric carbon dioxide. A substrate may be any resin, polymer films, metal plates, glass slide, mica, silicon wafer, or any surface suitable for the deposition of ordered structures produced via the disclosed methods.

The calcium source and phosphate source, along with optional additives identified above, are suspended in a suitable solvent. Such solvents include, but are not limited to, water, ethanol, methanol, glycerol, glycol and glycol derivatives, e.g., ethylene glycol and propylene glycol, and combinations thereof. The solvent may also include an acid which aids in the suspension of the calcium and phosphate sources. Nonlimiting examples include nitric acid, hydrochloric acid, sulfuric acid, acetic acid, and other protic acids.

Adjustment of pH: The suspension may be adjusted to a pH greater than or equal to about 6. Addition of a basic additive to the suspension may adjust the pH to an appropriate range for the production of the ordered structures. Nonlimiting examples of suitable bases include ammonium hydroxide, sodium hydroxide, potassium hydroxide, and the like. In some cases, the pH is adjusted to pH of about 8 or greater. In other cases, the pH is adjusted to the range between about 6 and about 8. In still other cases, the pH is adjusted to between about 8 and about 11. Additionally, the pH may be adjusted to above about 11. Generally, the pH of the suspension is initially low to allow for the calcium salts and phosphate salts to dissolve or disperse in the solvent. The pH is then elevated to allow for the hydroxyapatite to precipitate out of the suspension into ordered structures. In some cases, higher pHs may allow for more carbonate to be incorporated into the suspension. Therefore, in some embodiments, the pH may be greater than 8, and carbonate from atmospheric carbon dioxide may be incorporated into the suspension. In some cases, the pH may be between about 6 and about 8 to support formation of enamel films. In cases where the pH is below about 6, the calcium and phosphate may not form HA or HA derivatives; when the pH is above 11, ordered structures may not form.

Heat Treatment: The methods disclosed herein include heating the suspensions to a temperature greater than or equal to about 25° C., and may be in the range of about 50° C. to about 150° C. Other temperature ranges include, but are not limited to, about 60° C. to about 130° C., about 70° C. to about 130° C., and about 120° C. to about 130° C. In some cases, the suspension is heated to a temperature in the range of about 70° C. to about 130° C. under a pressure that is greater than atmospheric pressure (1 atm), and in some cases, is above 2 atm. When the temperature is above 130° C., the pressure may be above 2.5 atm. Temperatures above 140° C. may require pressures above 3 atm. Temperatures to 150° C. may require pressures up to 5 atm.

Temperatures below about 25° C. do not lead to HA, but may form other calcium phosphate derivatives. When a fluoride source is added to the suspension, the temperature may be below 70° C. in order to form ordered structures of FA, but in cases when there is no fluoride, the temperature may be above about 70° C. in order to form ordered structures of hydroxyapatite. In order to support formation of enamel films, the temperature may be between about 120° C. and about 130° C., inclusive, and/or under a pressure greater than 2 atm.

The suspension is heated for a length of time sufficient to form HA nanorods or crystals or, in some cases, ordered structures of HA nanorods or crystals. The time may be dependent upon the temperature and pressure under which the suspension is heated. If the ordered structures desired are balls or sphere-like structures, the time may be about 5 minutes. In order to generate nanorods or other ordered structures, the time is greater than about 10 minutes, and in some cases is between about 10 hours and about 120 hours. Above about 120 hours, ordered structures do not form, rather plates of HA or HA derivatives form. To form enamel plates, the heating may be selected to last between about 10 hours and about 48 hours.

In general, crystal dimensions increase, and the crystalline structure improves, as the pressure, aging time or temperature increase. Higher pressures and higher temperatures and longer aging times result in the formation of thicker and more ordered HA enamel films deposited in the presence of a substrate. In some cases, the pH of the suspension is initially low to allow the calcium salts and phosphate salts to dissolve or disperse in the solvent. The pH is then elevated to allow the hydroxyapatite to precipitate out of the suspension into ordered structures. Production parameters such as pH, temperature, and pressure may be selected to allow precipitation of hydroxyapatite in a controlled manner and to support formation of ordered structures, as described herein. Specifically, the pH may be adjusted higher such that the calcium and phosphate salts begin to precipitate out of the suspension. Control of the formation of the ordered structures may then be achieved by balancing the pH and temperature of the suspension. Additionally, the pressure may be elevated above atmospheric pressure, such as in cases where the temperature is above 100° C., so as not to alter the concentration of the suspension through evaporation of the solvent.

In some embodiments, as a result of implementing the foregoing suspension and heating procedures, the shape and morphology generally develop from amorphous structure, to hollow balls and finally to well defined crystals, as aging time is increased. When calcium from the calcium source interacts with phosphate from the phosphate source and, in some embodiments, fluoride, a suspension is formed after only a few minutes at room temperature. This suspension may lead to two types of crystals. One is the thermodynamically stable HA or FA with a rod-like structure which has a hexagonal cross section and a long c-axis. The other structure that may form is a less thermodynamically stable amorphous calcium phosphate or fluoridated calcium phosphate. This amorphous compound is kinetically favored at low temperatures and adopts a spherical shape in order to keep surface energy low.

The less thermodynamically stable compound is more likely to form in a solution with a low calcium concentration and a high phosphate concentration. As the aging time progresses, more calcium can dissociate from the calcium source (e.g., EDTA-Ca—Na$_2$), which causes the amorphous calcium phosphate (or amorphous fluoridated calcium phosphate) to convert to the more thermodynamically stable ordered HA. The spherical calcium phosphate dissolves and forms a layer of HA (or FA, if fluoridated) multi-crystals outside the spherical calcium phosphate nucleus. Once the entire nucleus is dissolved, only the shell-structure is visible, which is unstable. Eventually, the crystals of the shell-structure redeposit into rod-like structures of the more thermodynamically stable, and desired, HA crystals or nanorods. The HA rod-like structures have the tendency to aggregate together side by side to form a bundle, due to the stronger van der Waals attraction along the long axis of the rods than at the rod ends.

Figure 3:
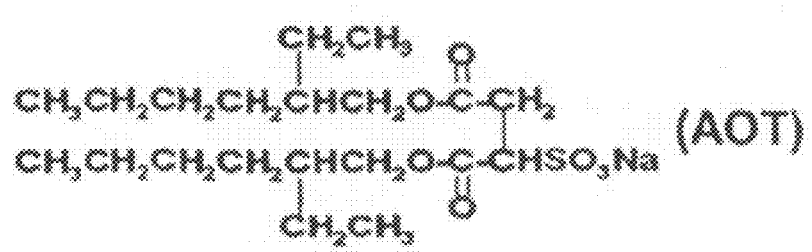
FIG. 3 shows a pictorial representation of a HA nanorod modified with a chemical monolayer of AOT (a surfactant) in accordance with another aspect of the disclosed methods.
Figure 3:
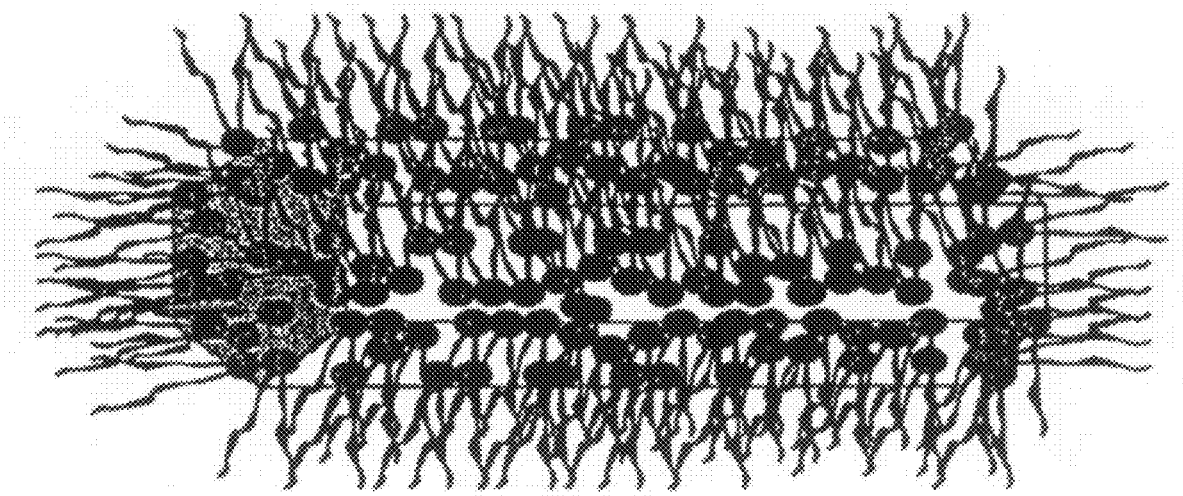

In some cases, the disclosed methods include modifying the surface of the HA nanorods obtained from the suspension heating method disclosed herein with a chemical monolayer of an amphiphile and suspending the coated nanorods on a water surface. The amphiphile may deposit to the surface of the HA nanorod and make the HA nanorod more hydrophobic. In order to accomplish this, the amphiphile may contain both hydrophobic and hydrophilic components. The hydrophilic components are attracted to the hydrophilic HA nanorod surface, while the hydrophobic components allow for the coated HA nanorods to have hydrophobic characteristics. A pictorial representation of the interaction of the amphiphile and the HA nanorod is seen in FIG. 3. The contemplated chemical monolayers may include amphiphiles such as surfactants and ionic polymers. Nonlimiting examples of surfactants and ionic polymers contemplated for use in the disclosed methods include docusate sodium salt (AOT), sodium dodecyl sulfate (SDS), cetyltrimethyl ammonium bromide (CTAB), polyamidoamine (PAMAM), PAMAM deriviatives (e.g., acetate, phosphate, carboxylic acid, or amine modified), PAMAM dendrimers, and the like. In certain cases, the nanorods may be mixed with a protein such as, e.g., amelogenin, enamelin, ameloblastin, dentin phosphoprotein (DPP), collagen, and the like.

One contemplated-means of coating the amphiphiles includes mixing the HA nanorods with a mixture of an amphiphile and a volatile solvent. Volatile solvents include low boiling organic solvents such as hexane, tetrahydrofuran, toluene, ethers, petroleum ether, isooctane, and the like. Any solvent that has a boiling point of less than 85° C. may be used in coating the nanorods with an amphiphile. The coated nanorods may then be transferred to a water surface and the volatile solvent allowed to evaporate. The coated nanorods, due to their hydrophobic nature, may be repulsed by the hydrophilic nature of the water surface and coalesce into ordered structures. In some cases, the addition of surfactants may be added to coat the HA crystals after the crystal have been formed into ordered structures. The addition of surfactant at this point results in the formation of long HA nanowires.

In accordance with one embodiment of the disclosed methods, enamel crystals are sonicated to reduce aggregation. This suspension are pipetted onto freshly cleaved mica and the solvent allowed to evaporate, leaving a coating of dispersed HA nanorods on the surface. The protein and amphiphile solutions are added and the sample introduced to the AFM fluid cell in the presence of a buffer. The exposure period of the proteins or amphiphiles to interact with the crystals is long enough to cause sufficient coating and/or binding, typically, between about 120 s and 10 min. The resulting coated HA nanorods may then coalesce into more highly ordered structures, such as nanowires or other more complex morphologies.

In accordance with other embodiments, a KSV 2000 Langmuir-Blodgett trough (KSV Instruments LTD, Helsinki, Finland) may be used. The KSV 2000 is a computer controlled and user programmable Langmuir-Blodgett instrument for automated Langmuir film experiments and for unsupervised deposition of normal multilayers onto solid substrates. The troughs are made of solid Teflon, 1.5 mm bottom thickness, mounted on a thermo regulated base plate. Barriers are made of hydrophilic material in order to provide leak proof film compression. Symmetric compression causes minimal film flow increasing the accuracy of the film pressure measurement. The Wilhelmy plate is evenly compressed from both sides and no shifting occurs even with the stiffest films. Since the dipping of substrate is performed at the center of film compression where the monolayers are uniformly oriented, the orientation of the molecules will not be altered during the transfer from water/air interface onto a substrate. Trough dimensions: 570×150 mm effective film area. Dipping well, 100 mm deep, in the center of the trough and perpendicular to the barrier of movement. Maximum size of substrate: 100× 100 nm. Film pressure measuring system: dynamic range: 0-125 mN/m; resolution: 4 µN/m; compression speed: 0.01.

Production of Enamel Films: In accordance with some aspects of the disclosure, the disclosed methods are directed to the production of films of ordered structures of HA nanorods. These films may be produced via, e.g., the presence of a substrate during the heating of the calcium source and phosphate source in the methods outlined above. With the substrate in the suspension during the formation of the ordered structures, the structures will form on the surface of the substrate, forming a film on that substrate. In some cases, the ordered structures may be transferred to a suitable substrate or matrix after they have been formed. Suitable substrates or matrices may include commercially available resin technology or existing resin matrix systems. Other, non-shrinking resins may also be used as a matrix for the HA nanorods. Other nonlimiting examples of resins contemplated for use in the disclosed methods include glass ionomer cement materials, resin modified glass ionomer cements, and polyacid modified composite resins. For dental or bone implantation, the titanium or steel implants may be used to deposit a layer of ordered HA films directly Some of the materials produced by the disclosed methods may advantageously act as "smart" materials. For example, the release of fluoride from the fluorapatite in the materials at low pH to combat dental caries and then a return to a nonfluoride releasing state as the pH increases, mimics a natural anticaries restorative material. This feature may allow the films to be applied to tooth restoration. In addition to biocompatibility and good aesthetics, satisfactory physical behavior is desirable for a restorative material used to replace diseased or damaged tooth structure. The methods of producing films disclosed herein may provide appropriate adhesive and mechanical characteristics to the resultant films that allow for a restorative including these films to contribute to the life span of the restored tooth. Incorporation of the nanorods may provide additional biomimetic tissue interactions via, e.g., the potential ion releasing capabilities, such as fluoride and carbonate ions. These properties may allow for better rebuilding and restoration of lost or diseased tissue.

In accordance with other aspects of the disclosure, the nanorods and ordered structures may be manufactured for use in connection with flowable and/or injectable restorative material for direct placement, laminate (veneer) restorations, lining materials, cement material, and incorporated into toothpaste. The nanorods and ordered structures may also be "fused" or "glued" (using resins etc) from which laminates, crowns, denture teeth, and teeth for preclinical laboratories are manufactured in laboratories or at the chair side.

In accordance with still other aspects of the disclosure, HA nanorods and the superstructures assembled therefrom may be manufactured or used to stimulate bone growth in the repair of bony defects and bone augmentation and pulp capping after pulp exposure, or incorporated into mono/polymers (resins), organic acids, and the like for dental/medical use, as described above. A titanium or steel implant modified with an HA enamel-like surface may be used for bone or dental implantation with a more durable clinical performance than the current implants available.

To these and other ends, the surface of the nano-size crystals may be made hydrophilic or hydrophobic to accommodate bonding to a resin matrix. Restorative materials have an optimal filler load in their matrix, striking a balance between maximum filler load (high strength and high viscosity) and optimal handling characteristics (reduced viscosity). The set material may have a hard and 'self-cleaning' smooth surface with a surface tension that is lower than that of plaque (and staining) to resist its accumulation. For optimal aesthetics, the final polish remains smooth over time, reflecting the light and retaining a glossy appearance. The inorganic filler fraction in volume percent has been considered relevant to estimating clinical performance. A high filler content results in improved physical particles in midway-filled (less than 60 vol %) and compact-filled (greater than 60 vol %). Filler content greater than 80 wt % (equals 61 vol % at assumed relative density of filler to resin of 2.5) showed reduced fatigue resistance (Tang et al., 1995) Composites with crystal-filler content of less than 60 vol %, and more than 60 vol % can be prepared. The resin matrix may be identical to the matrix of the reference composite. In alternative embodiments, the choice of the relative content of the resin matrix in conjunction with proper selection of filler content may be made to fulfill the needs of specific indications for use, as desired. The reference composite (RC) may be a representative of nanofilled composite resins, generally regarded as the material of choice for direct tooth-colored restoration of posterior teeth. In general, nanofilled composite resins show low shrinkage and high elastic modulus, a high flexural strength (100-150 MPa) and a Knoop hardness of greater than 60 KHN. The intrinsic surface roughness, lower than enamel-to-enamel contact ($R_a$=0.64±0.25 µm) ensures excellent polishability and the high amount of inorganic filler particles results in high wear resistance.

EXAMPLES

All materials used in the following examples are commercially available from chemical supply companies such as Sigma Aldrich (Milwaukee, Wis., USA). The experiments and experimental procedures set forth below provide guidance for production and analysis of the ordered structures disclosed above. Furthermore, a number of characterization methodologies were employed in connection with the analysis of the experimental results, respective brief descriptions of which are set forth immediately below.

Fourier Transform Infrared (FT-IR) Spectra: The infrared spectra of crystals were characterized by a PERKIN ELMER Spectrum BX FT-IR system, using a KBr pellet method. The settings were as follows: scan number: 8; scan range: 400-4000 $cm^{-1}$; and resolution: 2 $cm^{-1}$.

Magic Angle Spinning (MAS)—Nuclear Magnetic Resonance (NMR): The $^{19}$F MAS-NMR measurements were conducted at a resonance frequency of 188.29 MHz using an FT-NMR spectrometer (DSX-200, Bruker, Germany). Spinning rates of the sample at a magic angle was 15 kHz. Recycle time was 120 s. The spectra for $^{19}$F were referenced to CaF$_2$ taken as −108 ppm relative to the more common standard of CFCl$_3$.

Atomic Force Microscopy (AFM): All samples were imaged in tapping mode in air, using a Nanoscope IIIa Multimode AFM and controller (Digital Instruments, USA). (Thickness=3.6-4.5 μm, width=28-30 μm, height=10-15 μm, length=125 μm, resonant frequency=297-378 kHz, spring constant=29-61 N/m, nominal tip radius of curvature=5-10 nm). Multiple images for each sample are obtained with scan sizes ranging from 500×500 nm to 10×10 μm at 70-80% of free cantilever amplitude. Widths, heights, and spaces of the samples were determined with Digital Instruments off-line section analysis.

Scanning Electrode Microscopy (SEM): SEM analysis and energy-dispersive X-ray spectroscopy (EDS) analysis were conducted on a Philips XL30FEG Scanning Electron Microscope (FEI company, Hillsboro, Oreg., USA)☐FEI Nova Nanolab Dualbeam Focussed Ion Beam Workstation and Scanning Electron Microscope (FEI company, Hillsboro, Oreg., USA) and JEOL 35C Scanning Electron Microscope (JEOL USA, Peabody, Mass., USA) operated at 10-20 kV. For better resolution SEM image, the samples for SEM were coated with Au/Pd film.

Transmission Electron Microscopy (TEM): A JEOL 2010 STEM/TEM analytical electron microscope operating at 200 kV and JEOL 3011 high resolution electron microscope operating at 300 kV (JEOL USA, Peabody, Mass., USA) were used for normal TEM imaging, high-resolution electron microscopy (HR-EM), selected area electron diffraction (SAED) and energy-dispersive X-ray spectroscopy (EDS) analysis.

Fluoride Analysis Fluoride incorporation into nanorods is measured using a fluoride electrode. Fluoride concentrations are measured using an Hanna Instruments fluoride electrode model FC301B connected to an Hanna Instruments microprocessor-based portable fluoride meter HI98401 (Hanna Instruments, Woonsocket, R.I.). Calculation of the concentrations of fluoride are presented in parts per million (ppm) in the nanorod.

Fluoride Release from the Nanorods: FA nanorod samples are placed in scintillation vials with 5 mL deionized water. Three times per day the pH of the water is adjusted to a pH about 4.5 for 30 min then returned to a pH of about 7. Polished daily fluoride concentrations are measured from this solution by withdrawing 2 mL water at the same time daily, and mixing with the 2 mL water total ionic strength adjustment buffer (TISAB) II (Orion Research Incorporated, Boston, Mass.). Deionized water is added back to the vials to keep the sample volume at 5 mL. This design mimics daily partial replacement of saliva in the mouth and the daily fluctuations of pH in the oral cavity after eating 3 meals a day. Daily measurement are taken on the samples for the first 4 days, then a cumulative fluoride release measurement is taken on day 32. Longer periods of fluoride release at 3 months, 6 months, and 12 months are also measured.

Flexural strength: Flexural strength testing is performed according to ISO 4049 for Resin Based Materials (2000). Rectangular bar specimens (25×2×2 mm) are centrally loaded using a knife edge indenter (0.3 mm width) across a support span of 20 mm to obtain three-point flexural data. Ten specimen of each group are prepared using stainless steel split molds. The samples are subjected to loading with a universal mechanical testing machine (Instron Corp, Canton, Mass.) at a crosshead speed of 1 mm/min, the load at fracture recorded and the flexural strength calculated from the equation sigma$_{max}$=3Pl/2bd$^2$, where sigmamax is the maximum flexural stress (MPa), P the measured load at fracture (N), l the support span distance (mm), b the width of the specimen (mm) and d the specimen thickness (mm). The molds are packed and overfilled with each material. Both top and bottom surfaces of each mold are covered with Mylar strips to prevent oxygen inhibition of the outer layers, and placed between two glass slides. The top surface of each mold are subjected to a 1 kg load for 30 s to ensure consistent and reproducible material packing. The samples are lightcured on both sides for 60 s at 2 mm from the sample surface using an overlapping curing procedure with a conventional halogen curing light. The light of the curing unit is measured prior to fabrication of each sample set (greater than 800 mW/cm$^2$) using a curing radiometer (Model 100, Demetron Research Corp., Danbury, Conn.). Following curing, the strips are pealed off, subjected to post-cure water immersion in a lightproof waterbath maintained at 37±1° C. for 24 hours. In addition, a morphological analysis of the fractured surfaces of the three samples of each group is made by SEM.

Hardness: The surface microhardness of the materials is determined at 15 min post-curing, and after 24 h, 1 week, and 1 month storage in water. Specimens (6×2 mm discs) are prepared in molds. Specimens are prepared similar to the above procedure outlined for flexural strength (no overlapping cure is needed). After fabrication, the specimens are subjected to post-cure water immersion in a lightproof waterbath maintained at 37±1° C. for a variable amount of time. Knoop hardness (KH) is measured on 5 samples per group using a Clark Micro-Hardness Tester (Model CM-700AT, Sun-Tec Corp, Novi, Mich.). Using a 500 gf load (15 s dwell time) the Knoop hardness values are measured at five indentations per specimen randomly located on the top surface. The Knoop hardness number (KHN) is calculated using KHN=14229.9 F/d$^2$ where F is the applied load (g) and d is the measured length (μm) of the long diagonal of the impression left by the diamond-shaped Knoop indenter (ASTM. Standards E384-89).

Surface Roughness/Polishability: Following placement, tooth-colored restorations require further finishing and polishing. Finishing is preferred to remove excess composite material and to adjust the occlusion. Polishing is of special importance because rough surfaces accumulate more plaque, show greater wear and are more abrasive towards the opposing tooth surfaces when occluding. The nano-size crystal filler leads to a very smooth surface composite. Efficient polishing prevents discoloration of rough areas and enhances the gloss and natural appearance of tooth-colored restorations. Finishing procedures should be kept to a minimum as they are inherently destructive to the restoration and may initiate subsurface micro-crack formation and propagation, which can cause early deterioration of the restoration. The heterogenic composite materials contain hard particles embedded in a soft matrix, making polishing difficult. Finished composite specimens may exhibit signs of selective resin matrix removal. This phenomenon causes protruding filler particles that may crack when subjected to mechanical stress, leaving the surface in a rough condition. Additional qualitative evaluation of the surface characteristics by SEM is important to evaluate such potential selective matrix removal.

The finishing and polishing characteristics of the composites disclosed herein are evaluated against a reference composite. The effect of two common finishing methods followed by two different polishing techniques on a surface of the composites is assessed. Sample preparation (6×3 mm discs) is similar to the procedures laid out above for specimen preparation for hardness. After curing of the samples and prior to storage for 24 h, the composite surface is ground flat under running water with silicon carbide paper discs of 400 and 600 grit for 30 s each. Per composite group, 32 specimens are divided into 2 groups of 16 and finished with 2 differed finishing burs: extra fine diamond (20 μm) or 16-fluted tungsten carbide bur (burs: Brasseler, Savannah, Ga.). After initial finishing, the 16 specimens of each group are subsequently divided into two groups of 8 and polished with one of the following polishing systems: (a) a series of Sof-lex aluminum oxide coated discs following a sequence of 100, 29, 14, and 5 μm discs (Sof-lex Discs, 3M/ESPE Dental Products, St. Paul, Minn.) or (b) rubber-like Enhance polishing disks followed by fine and superfine polishing pastes (Enhance System Dentsply/Caulk, Milford, Del.). Five random readings are taken per specimen. The polished surface is evaluated quantitatively by surface profilometry with respect to Ra and profile-length ratio using a profilometer (Surfanalyzer System 400, Federal Products Corp, Providence, R.I.). Qualitative assessment is carried out by SEM evaluation.

Wear: The surface roughness influences the wear characteristics of the material. Long-term clinical studies have demonstrated that microfilled composites are the most wear-resistant formulations. Laboratory studies of recent highly-filled composites have shown similar or improved wear characteristics. To obtain initial measurements of in-vitro surface wear the composite samples are tested using a pin-on-disc wear machine. Specimens (12×3 mm discs) are prepared as described above for surface roughness testing. After initial finishing and polishing with Sof-lex discs to 5 μm variance, the specimens are polished with 1 μm diamond paste to obtain a consistent highly polished surface. Five disks of each material is abraded against five human enamel abraders (polished to a 3 μm variance on silicon carbide paper). The samples are tested in human saliva with a constant load of 1 lb (453.6 g) during 10,000 rotational cycles. The amount of ear on the composite discs is measured with a profilometer at four locations on the circular path left by the enamel abrader. Vertical loss is calculated and an average of the four readings is used for data analysis. Quantitative results are statistically examined, and additional SEM evaluation of three samples per group provides supporting qualitative morphological data.

The physical data is analyzed using one- and two-way ANOVE for the values of multiple specimens per group and at a significance level of 0.05. After confirming significance of the obtained data, t-test is applied to establish the contrast between mean values.

Example 1

Synthesis of HA Nanorods

About five hundred milligrams to five grams of HA powder (Sigma-Aldrich Co., Milwaukee, Wis.) were placed in a beaker and 500 ml distilled water was added. The suspensions were stirred continuously and nitric acid ($HNO_3$) was added until the powder dissolved. The pH was then adjusted to 2. The resulting solution had a Ca/P ratio similar to that of hydroxyapatite (Ca/P=1.67). Ammonium hydroxide was then added dropwise to 20 ml of the above solution, under continuous stirring, until pH 6-11 was reached.

The nanorods of hydroxyapatite nucleate and grow from this supersaturated aqueous solution of HA as the pH of the solution increases. The resulting suspension was sealed in a tube and kept in a water bath at 25-70° C. for 18 h-7 days. The suspension was then centrifuged and washed with distilled water (pH 7.4) 4 times. The resulting pellets were dispersed in methanol and sonicated before pipetting onto mica surfaces for imaging with AFM, and holey-carbon film coated copper grids for TEM and EDS analysis. Approximately 1 mg of synthesized HA nanorods was characterized with FTIR using KBr pellets.

Figure 2:
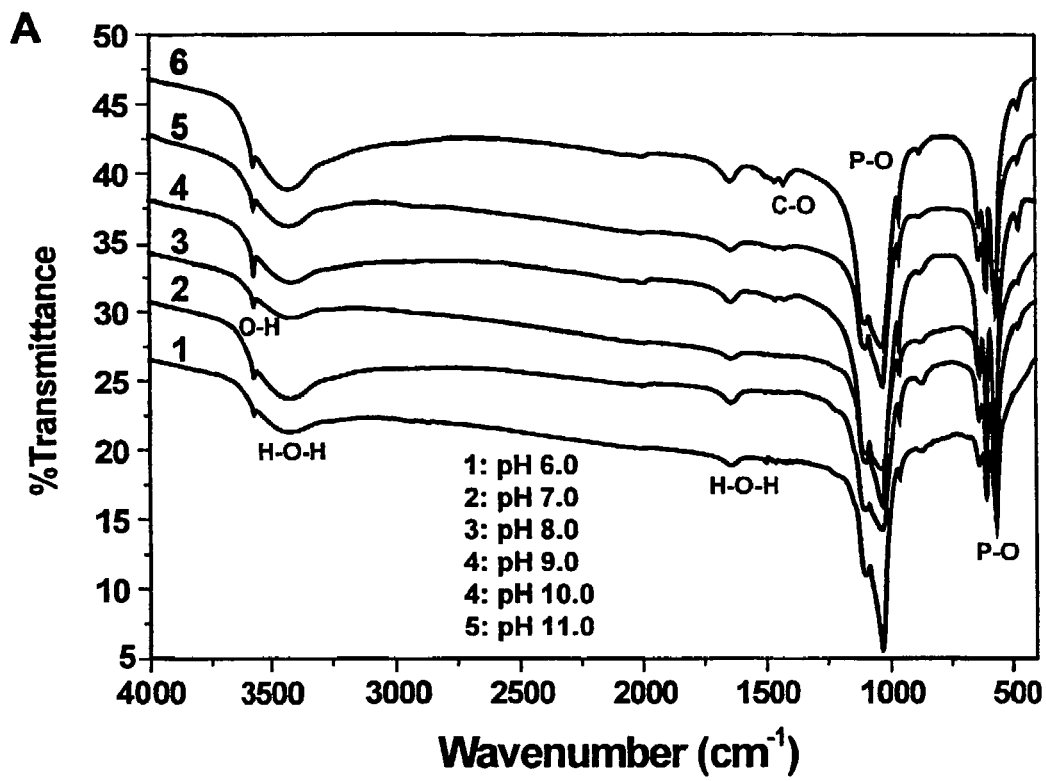
FIG. 2 shows (a): a FTIR spectra of synthetic FA crystals prepared at different pH's; (b): 1) a FTIR spectra of enamel crystals; 2) a typical FTIR spectra of synthetic HA crystals; 3) a typical FTIR spectra of the synthetic hydroxyapatite modified with the AOT showing an AOT signal at 2960 $cm^{-1}$ and 1738 $cm^{-1}$ indicating AOT surfactant binding to the HA surface.
Figure 2:
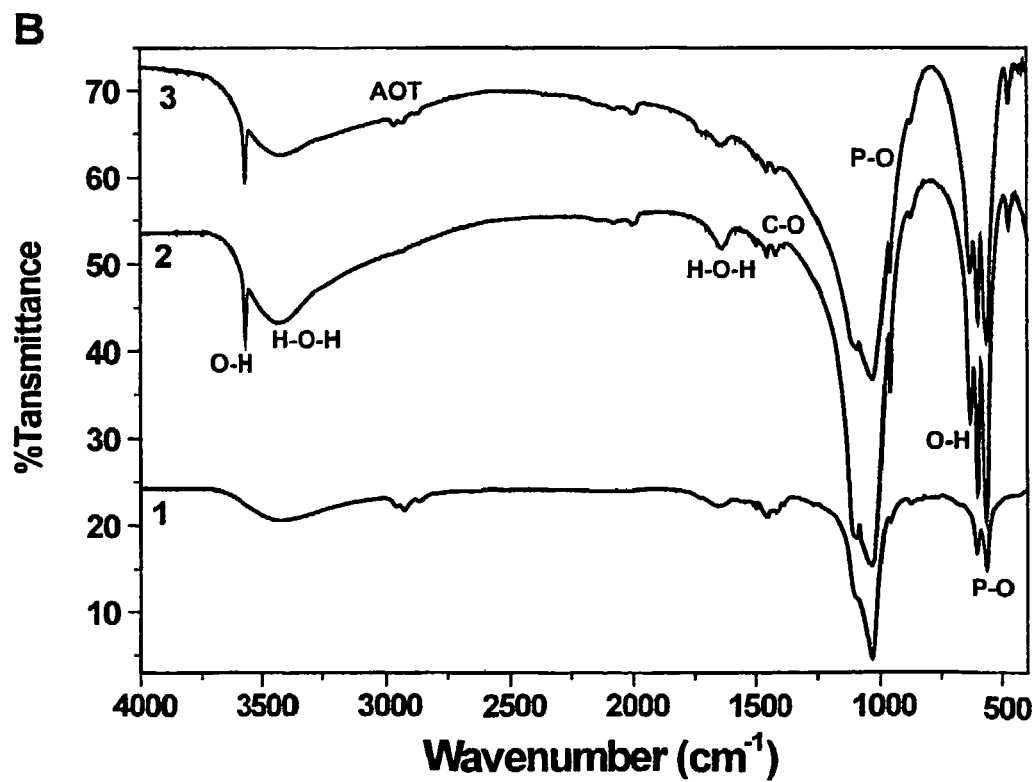

The size of the HA nanorods varied depending upon the aging time and the pH of the suspension during heating. The HR-TEM images and SAED pattern indicated that all these crystals are single crystals with a HA crystalline structures (FIG. 1—p 22 app 2). The EDS data show that the Ca/P ratio is between 1.6-1.7, which approaches the theoretical ratio of HA (Ca/P=1.67). FIG. 2a shows the FT-IR for the natural enamel crystals. FIG. 2b shows the FT-IR for the synthesized crystals which are comparable to the standard spectra of HA.

Example 2

Modification and Assembly of Synthetic HA Nanorods

Three to five mg synthetic HA nanorods were added to 3 mL AOT (docusate sodium salt) isooctane solution (5 mM) to make a stable HA nanorod colloidal suspension. The suspension was sonicated before use. FIG. 3 shows a pictorial representation of the coated HA nanorods. An aliquot of 100-200 μL of the HA colloidal suspension (1-2 mg/mL) was spread, dropwise, onto the surface of the water (pH 7). The isooctane was evaporated and stable LB films of the nanorod assemblies were formed at the water-air interface. These films were then transferred carefully onto TEM grids covered with a continuous thin film of carbon for TEM and onto mica for AFM. FIG. 2c shows the FT-IR of the synthetic hydroxyapatite surface with the AOT signal suggesting that the AOT surfactant is binding to the HA surface.

Example 3

LB Films of HA Nanorods

Figure 4:
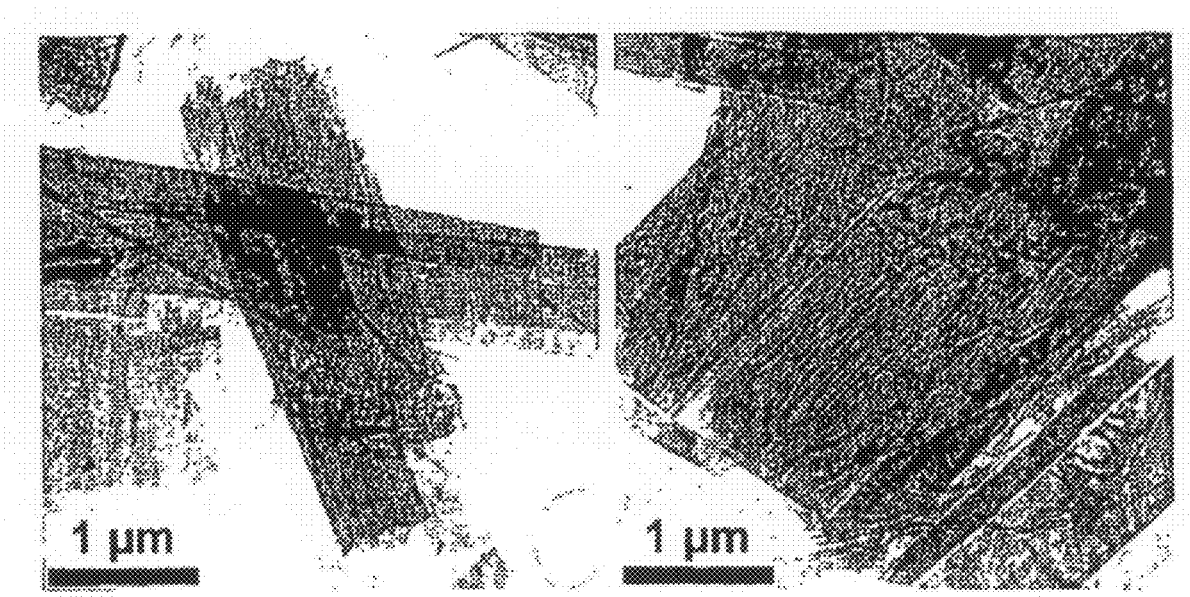
FIG. 4 shows TEM images of HA crystals assembled into ordered structures via the coating of an amphiphile in accordance with yet another aspect of the disclosure.
Figure 5:
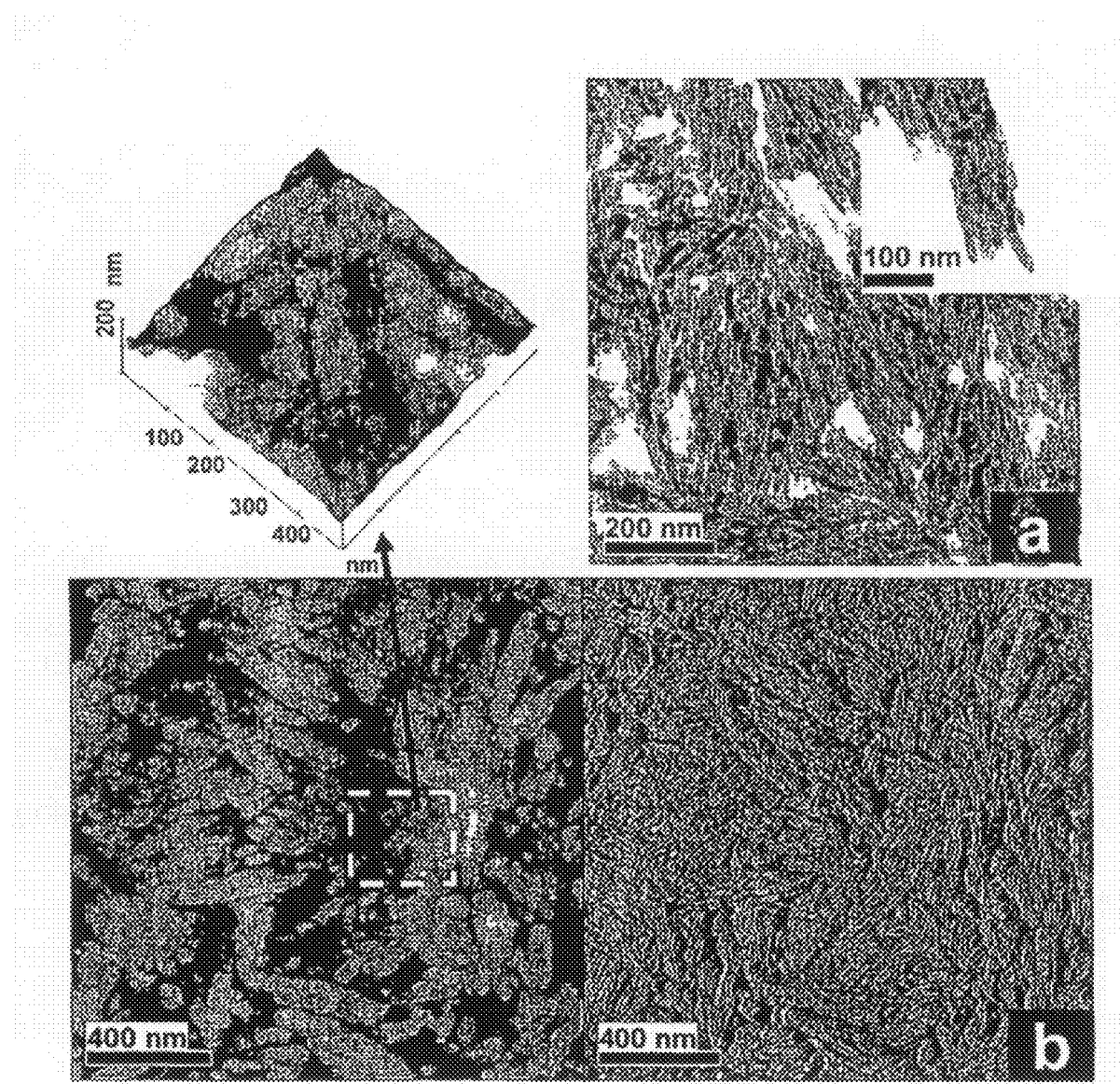
FIG. 5 shows TEM and AFM images of HA assemblies, where the architecture of their prism-like structures is similar to that found in natural enamel.

The LB films of these AOT surfactant modified HA nanorods were examined using AFM and TEM. FIG. 4 shows the TEM images of the assemblies of HA which are approximately 100-200 nm in cross section and 3-5 μm in length. In FIG. 4a, these assemblies appeared to be made of bundles of the same size crystals and aligned parallel to each other. These structures can be extended to form a sheet of 3-5 μm wide (FIG. 4b), but generally the LB films of HA crystals of this size are not able to self-assemble into closely packed films. As seen in FIG. 5a, these crystals are able to form 3D nematic structures with very similar architecture to that of enamel prisms. The size of these nematic structures are approximately 400 nm in length and 100 nm in cross section. The AFM image (FIG. 5b) shows the densely packed structure formed from these HA assemblies.

Example 4

Synthesis of Fluorapatite (FA) Nanorods

Hydroxyapatite powder (104.6 mg, Sigma Aldrich) and sodium fluoride (8.4 mg, Sigma Aldrich) were mixed with 100 mL distilled water. The suspension was stirred continuously and nitric acid added until the powders dissolved. The pH was adjusted to 2.4. Ammonium hydroxide was then added dropwise until the pH reached the desired range of 6-11. The suspension was sealed in a plastic tube and kept in a water bath at 25-70° C. for 5 days. The suspension was then centrifuged and washed with distilled water (pH 7.4) 3 times. The resulting pellets were dried in a vacuum before being used. Three to five mg of the resulting synthetic FA nanorods were added to 3 mL AOT isooctane solution (5 mM) to make a stable FA nanorod colloidal suspension. The FA nanorod became covered with a monolayer of AOT making the FA nanorods hydrophobic.

Figure 6:
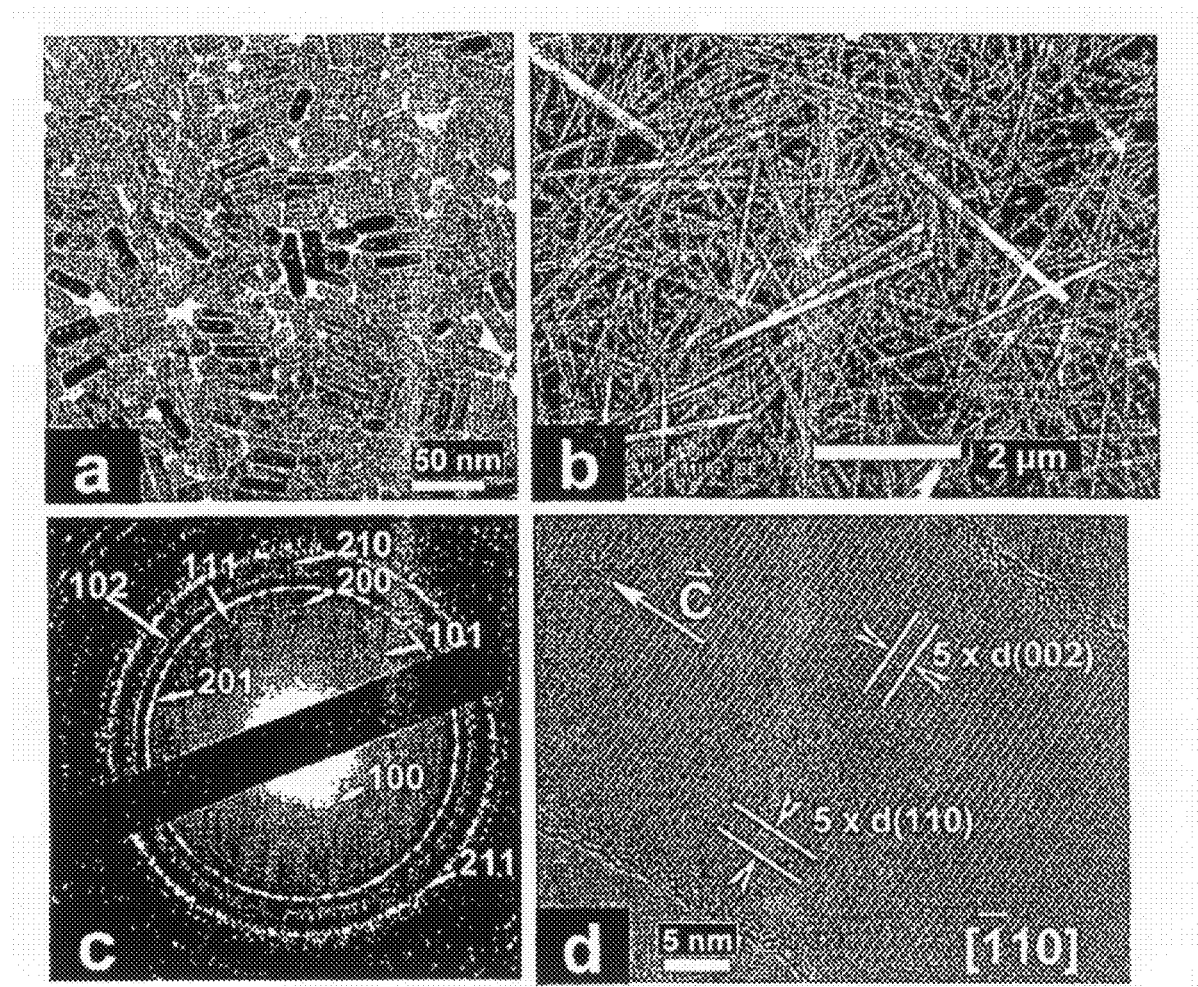
FIG. 6 shows, in accordance with yet another aspect of the disclosed methods, (a): a TEM image of short FA nanorods prepared at pH 6.0, 70° C. for 5 days; (b) a SEM image of long FA nanorods prepared at pH 6.0 in the presence of EDTA and treated for 6 hours hydrothermally at a temperature of 121° C. and pressure of $2.4 \times 10^5$ Pa; (c) a SAED pattern of the synthetic crystals prepared at pH 6.0 and 70° C. for 5 days, with lattice planes corresponding to several rings have been indicated by arrows; (d) a HRTEM image of a long FA nanorod.
Figure 7:
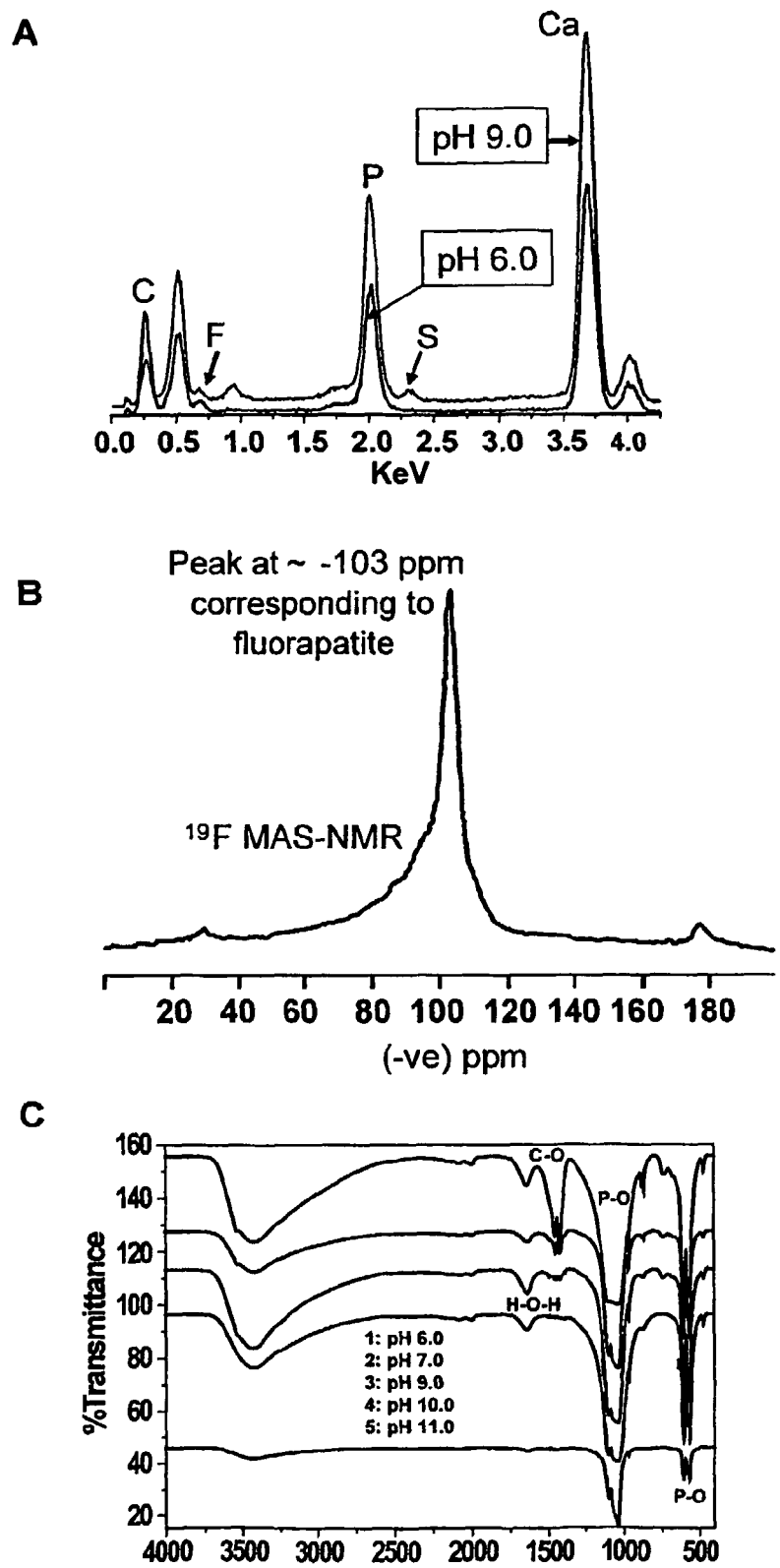
FIG. 7 shows (a) an EDS of FA nanorods prepared at different pH's; (b) a $^{19}F$ MAS-NMR of FA nanorods prepared at pH 7.0; (c) a FTIR spectra of synthetic FA crystals prepared at different pH's, in accordance with still another aspect of the disclosed methods.
Figure 8:
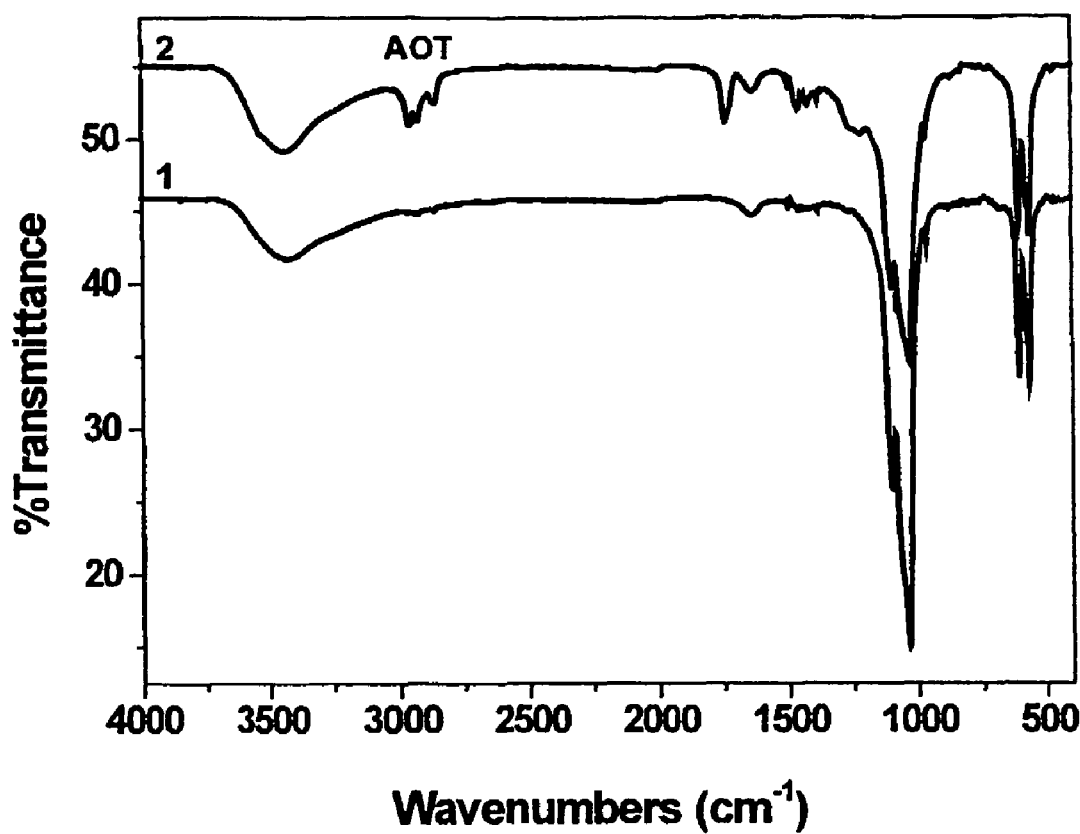
FIG. 8 shows, in accordance with yet another aspect of the disclosed methods, typical FT-IR spectra of: 1) synthetic FA prepared at pH 6.0 and 2) synthetic FA modified with AOT.

The HR-TEM images and SAED pattern indicate that all these nanorods are single crystals with a typical apatite crystalline structure (FIG. 6). In FIG. 7a, the EDS data show that the Ca/P ratios are between 1.6-1.7, which approaches the theoretical ratio of FA (Ca/P=1.67). FIG. 7b shows the $^{19}F$ MAS-NMR of FA nanorods prepared at pH 7.0. The strong and sharp peak of $^{19}F$ resonance at −103 ppm is the typical $^{19}F$ chemical shift of fluorapatite. FIG. 7c shows the FT-IR spectra of these FA nanorods prepared at different pHs. The P—O bond of the phosphate group's stretching and bending vibration remained in the same position at 1096 $cm^{-1}$, 1032 $cm^{-1}$, 964 $cm^{-1}$, 604 $cm^{-1}$, and 564 $cm^{-1}$, for all pHs, which indicated that all of these nanorods retained the same apatite crystalline structure. However, the stretching vibration mode of the carbonates at 1424 $cm^{-1}$ and 1453 $cm^{-1}$, and the stretching vibration mode of the OH ions at 3570 $cm^{-1}$ increased with increasing pH. This suggests that the crystals incorporated more carbonate and hydroxyl ions at high pH. The crystals prepared at pH 11 seemed to be a carbonated fluor-hydroxyapatite with a very sharp peak at 1424 $cm^{-1}$, 1453 $cm^-$, and a peak at 3570 $cm^{31\ 1}$. This result shows that fluoride ions are taken up at high pH, although the crystalline structure of apatite was maintained. FIG. 8 shows the FT-IR of the synthetic crystal surface with the AOT signal, suggesting the AOT surfactant is binding to the FA surface. The EDS data of these AOT modified FA crystals also clearly show the S peak of AOT (FIG. 7). It may be possible to use the above nanorods as resin fillers for composite restorations. The advantage of these nanorods is that the physico-chemical composition is similar to the dental mineral and the release of the fluoride ions at low pH from this restorative material to the tooth will prevent further caries and aid in remineralization.

Example 5

Effect of Amelogenin on Nanorod Formation

Figure 9:
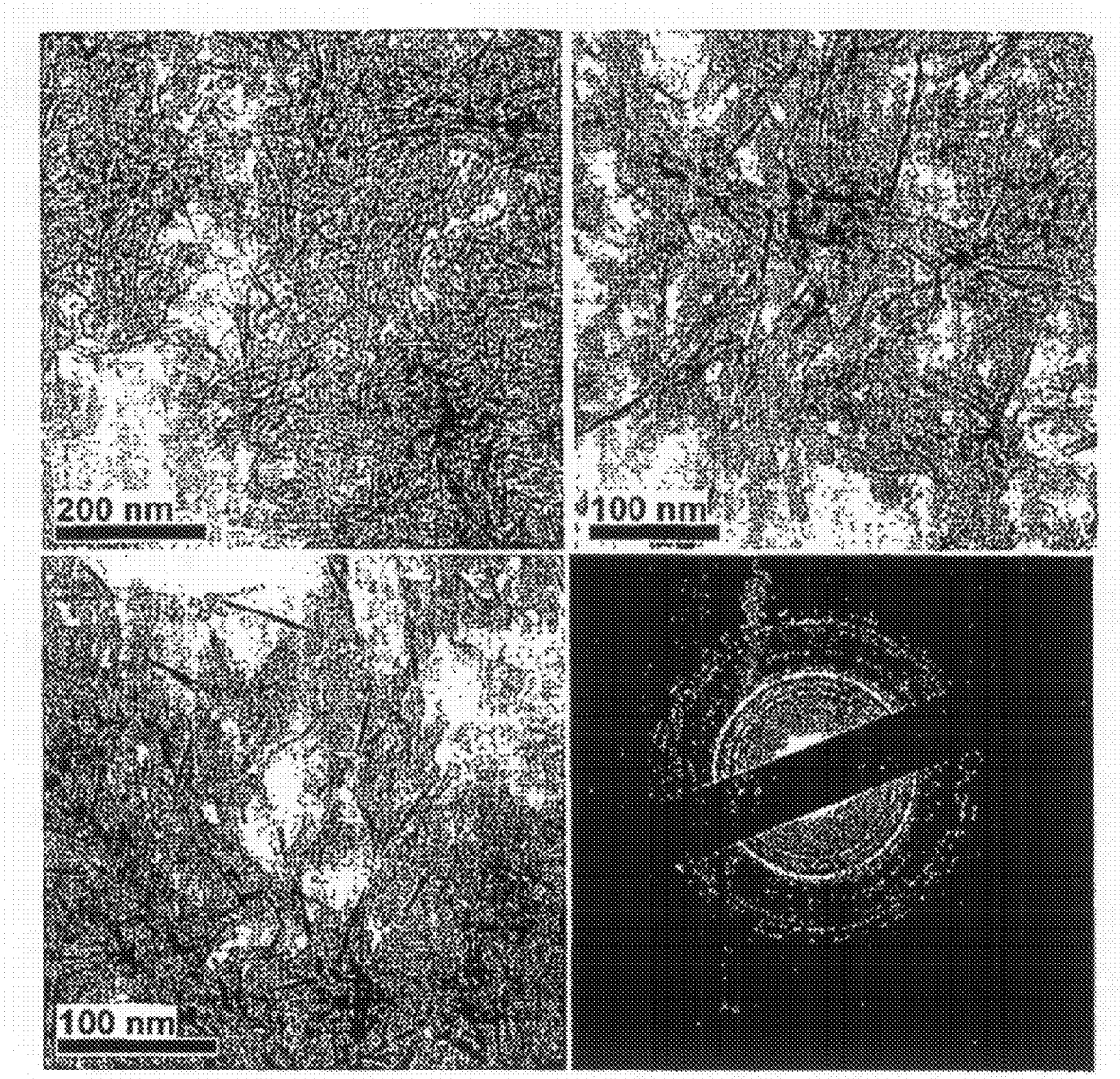
FIG. 9 shows HA nanofibers formed in the presence of amelogenin and SAED images showing that the crystals have a HA crystalline structure, in accordance with still another aspect of the disclosed methods.

This experiment shows the effect of the presence of amelogenin, the main enamel protein, on the initiation and growth of HA crystals. The methodology used in the initiation of HA crystals is a modification of that used in previous examples, which successfully showed the synthesis of nanoscale HA crystals in similar size and chemical composition to human enamel by directly adjusting the solution pH and controlling the aging of the precipitates. Briefly, 40 mg HA powder (Sigma Aldrich) was mixed with 40 mL distilled water. The suspension was stirred continuously and nitric acid added to dissolve the powder. The pH was then adjusted to 4.0. Amelogenin (0.2 mg/mL) was added to the solution and sonicated. Ammonium hydroxide was then added dropwise to the above solution until the desire pH 7.4 was reached. After aging in a water bath at 37° C. for 24 hours, the suspension was centrifuged at 14,000 rpm for 2 minutes, and the supernatant was removed. The pellet was further washed with water to removed the ammonium nitrate and finally dispersed in water (pH 7.4). The suspension was dropped onto holy-carbon coated copper grids and dried for TEM measurements. FT-IR spectra of the prepared HA crystals were characterized using KBr pellet method. FIG. 9 shows the typical TEM images of the crystals formed in the presence of amelogenin. The fibers that formed have a very high aspect ratio (c/a) of 30-40 with a cross section approximately 3-4 nm and a length of approximately 120 nm. All the fibers are similar in cross section although their lengths vary depending on different deposition time, the type and the concentration of the proteins. The SAED pattern shows that these crystals have a HA crystalline structure. The formation of the nanofiber indicates that the HA crystal has an asymmetric growing speed with the c-axis growing much faster than the a- and b-axes. The very similar cross section size of all the fibers indicate that the growth in the a- and b-axes was limited once a critical cross section size was reached. The critical size along the a- and b-axes may be related to the inherent characteristics of the crystals. It is possible that only when the crystals have reached a critical size can the small nucleates stably exist for subsequent growth in the solution. Once the crystals were formed then the ab-plane (parallel to the c-axis) would tend to adsorb the proteins more tightly than that of the c-plane (perpendicular to the c-axis). This would result in a limited growth of the crystals along the a- and b-axes, while the c-axis is extended to form a nanofiber structure.

Example 6

Synthesis of Fluorapatite Nanorods Using EDTA

Typically, 9.36 g ethylenediamine tetraacetic acid calcium disodium salt (EDTA-Ca—$Na_2$) and 2.07 g sodium phosphate hydrate ($NaH_2PO_4.H_2O$) were mixed with about 90 mL distilled water. The suspension was stirred continuously until the powder dissolved. The pH was adjusted to 6.0 using sodium hydroxide. Prior to mixing 0.21 g NaF in 90 mL of the EDTA-Ca—$Na_2$ and $NaH_2PO_4$ solution, it was dissolved in 10 mL water (pH 7.0) and stirred continuously. After several minutes at room temperature the above mixture forms a suspension which was autoclaved using the liquid cycle at 121° C. at a pressure of 2.37 atm for 5 minutes to 10 hours. All final suspensions were centrifuged and washed with distilled water (pH 7.4) 3 times. The resulting pellets were dried in a vacuum before use.

Figure 10:
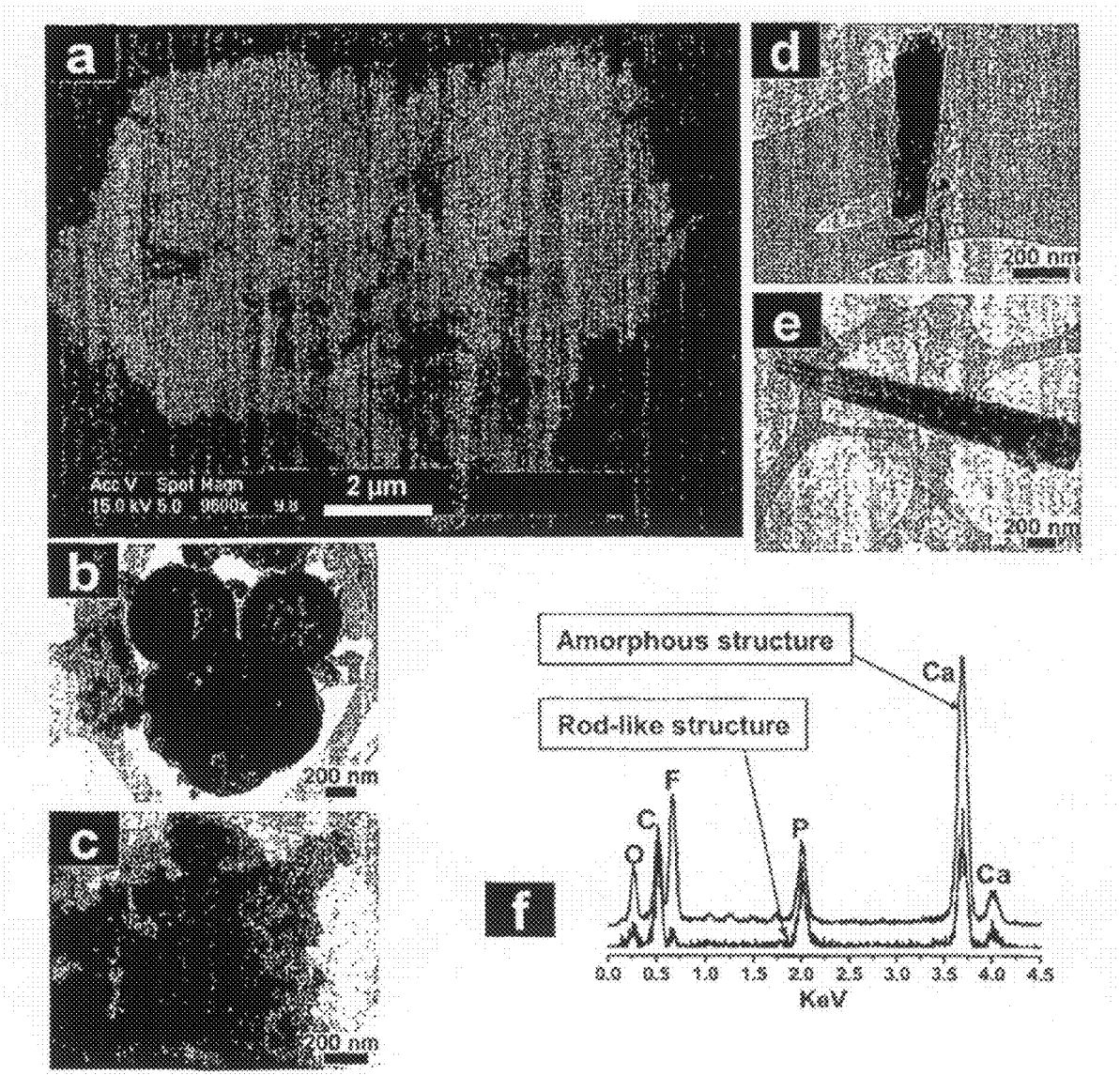
FIG. 10 shows sample before autoclaving. a) SEM image shows that the sample mainly consists of amorphous deposits; b, c) TEM images show that the sample mainly consists of amorphous particles and some ball-like structures; d, e) TEM images showing several rod-like structures in the sample; f) EDS analysis demonstrates that the amorphous structures contain more fluoride than those of rod-like structures.
Figure 11:
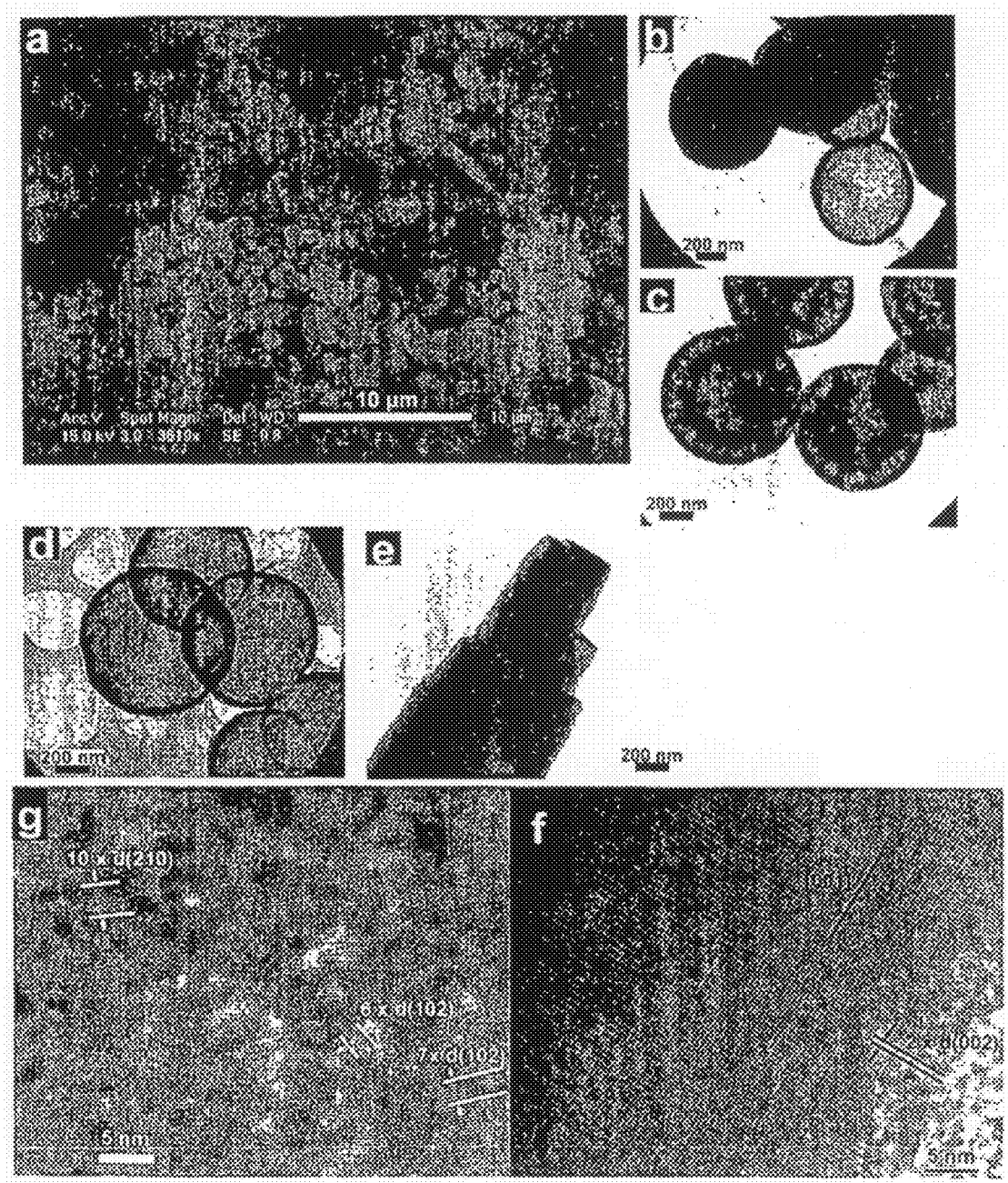
FIG. 11 show SEM and TEM images of samples after autoclaving for 5 minutes, in accordance with yet another aspect of the disclosed methods; a) SEM image shows that the sample mainly consists of ball-like structures and some rod-like structures; b, c, d) TEM images show the ball-like structures in higher resolution; e) TEM images shows part of the rod-like structures are made of small rods aligned parallel to each other; f) HRTEM of rod-like structure shows the typical apatite characteristics; g) HRTEM of a wall of ball-like structure which show the nano-crystals contained within it.
Figure 12:
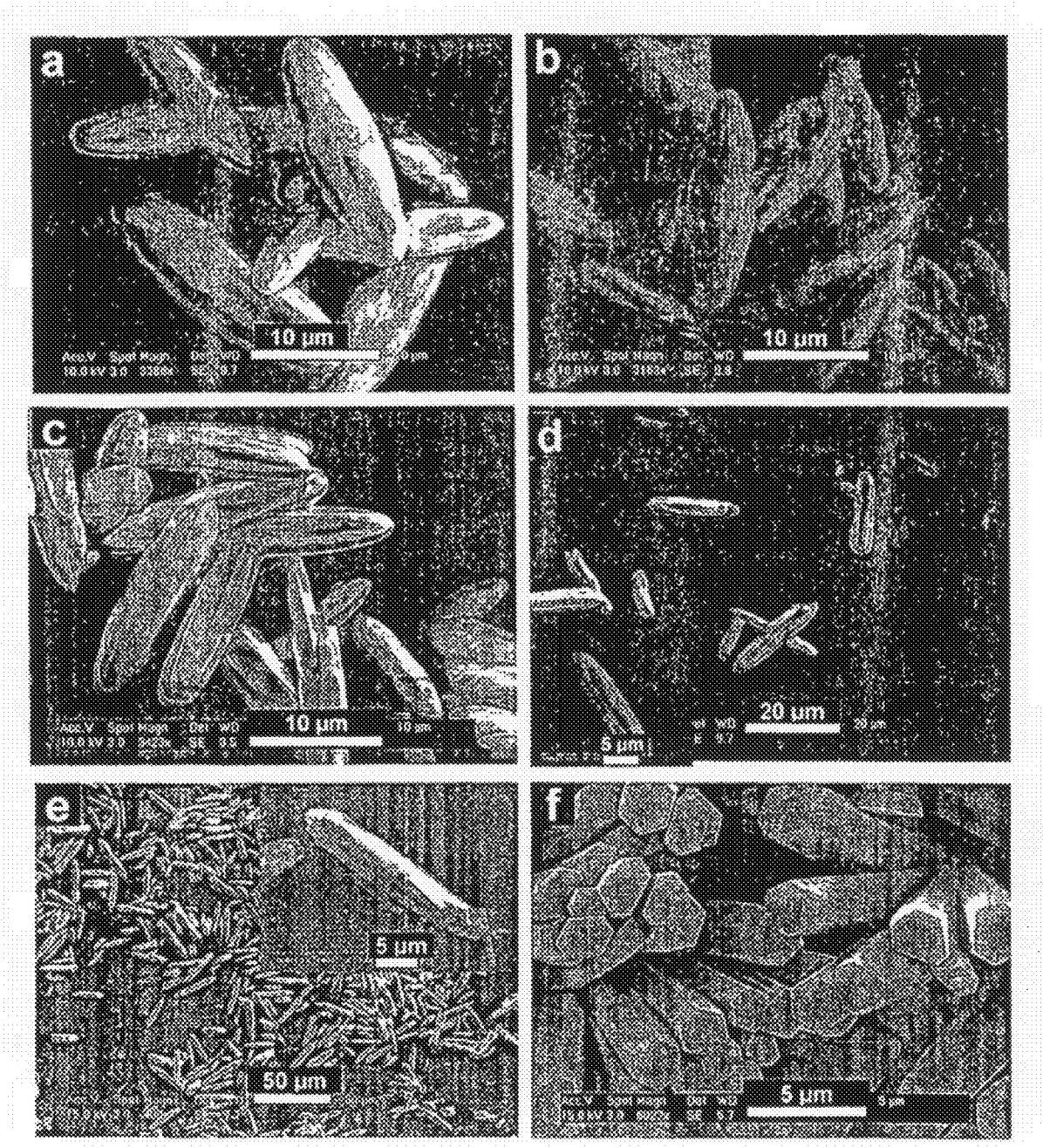
FIG. 12 shows SEM images of samples after autoclaving 10 minutes to 10 hours. a) 10 minutes; b) 20 minutes; c) 30 minutes; d) 1 hour; e) 6 hours; f) 10 hours, in accordance with another aspect of the disclosed methods.
Figure 13:
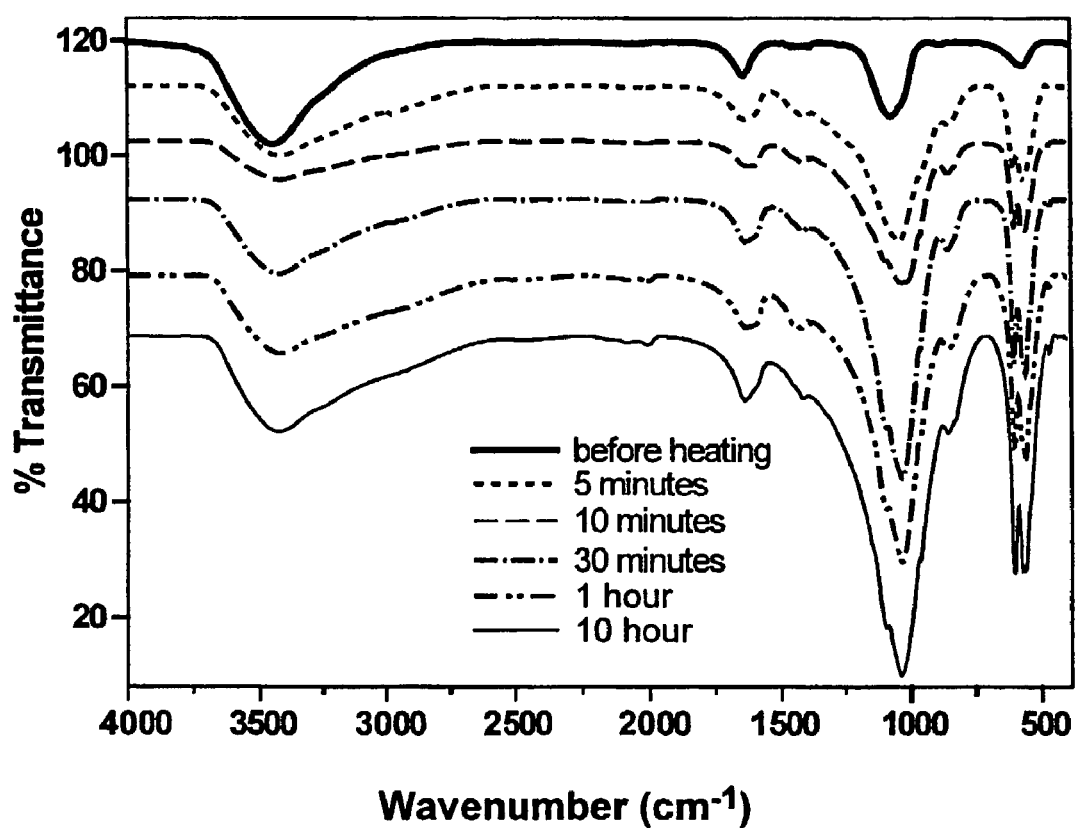
FIG. 13 shows FTIR spectra of samples before and after autoclaving. FTIR shows that all these samples have the typical characteristics of an apatite structure. As the autoclave time increased the crystals are becoming more well defined, in accordance with yet another aspect of the disclosed methods.

The shape and morphology of the synthetic FA crystals varied depending upon the autoclave times. The TEM and SEM images showed that the suspensions formed in the early stages while at room temperature and consisted mainly of amorphous particles and very few rod-like structures as indicated by the EDS and TEM imaging (FIG. 10). The rod-like structure had a well-defined crystalline structure while the amorphous structure showed mainly the amorphous rings and some nanocrystal diffraction pattern. In the amorphous structure, there was also evidence of some ball-like structures. The EDS clearly showed the difference between these two sorts of structures. Interestingly, after autoclaving for 5 min, the amorphous structures were almost totally replaced by ball-like structures, and more rod-like structures were formed (FIG. 11). Some of these ball-like structures contained solid structures. The TEM images showed that the outer-shell of the ball was made of many small crystals with different orientations. The EDS also clearly showed the difference between these two sorts of structures. The ball-like structures contained relatively more fluoride than those rod-like structures. After autoclaving for a longer time, only the rod-like structures were seen (FIG. 12). As autoclaving time increased, the crystals changed from shuttle-like structures to more well-defined microcrystals. This was particularly true for the micrometer-sized units consisting of fluorapatite nanorod bundles that were created after autoclaving for 6 h. The large units were approximately 20 μm in length and 5 μm in cross section. Each unit was comprised of a bundle of fluorapatite nanorods arranged parallel to each other. These nanorods were approximately 20 μm in length and 400 μm in diameter. The FT-IR analysis confirmed the change to the typical apatite structure over time (FIG. 13). At the beginning, the FT-IT spectra showed a blunt peak at the 1076 $cm^{-1}$, 570 $cm^{-1}$, and 3448 $cm^{-1}$ for those samples prior to autoclaving, which corresponded to the vibration of phosphate and the presence of water at the early stage of crystal development. Later, the peaks became sharper and more distinctive, especially for the phosphate vibration peak at 570 $cm^{-1}$. The relative strength between the water peak at 3448 $cm^{-1}$ and the phosphate peaks at 1038 $cm^{-1}$ and 566 $cm^{-1}$ decreased as the autoclave time progressed, indicating that the crystals were becoming more well defined.

Example 7

Synthesis of Fluorapatite Nanorods in the Presence of a Substrate

Figure 14:
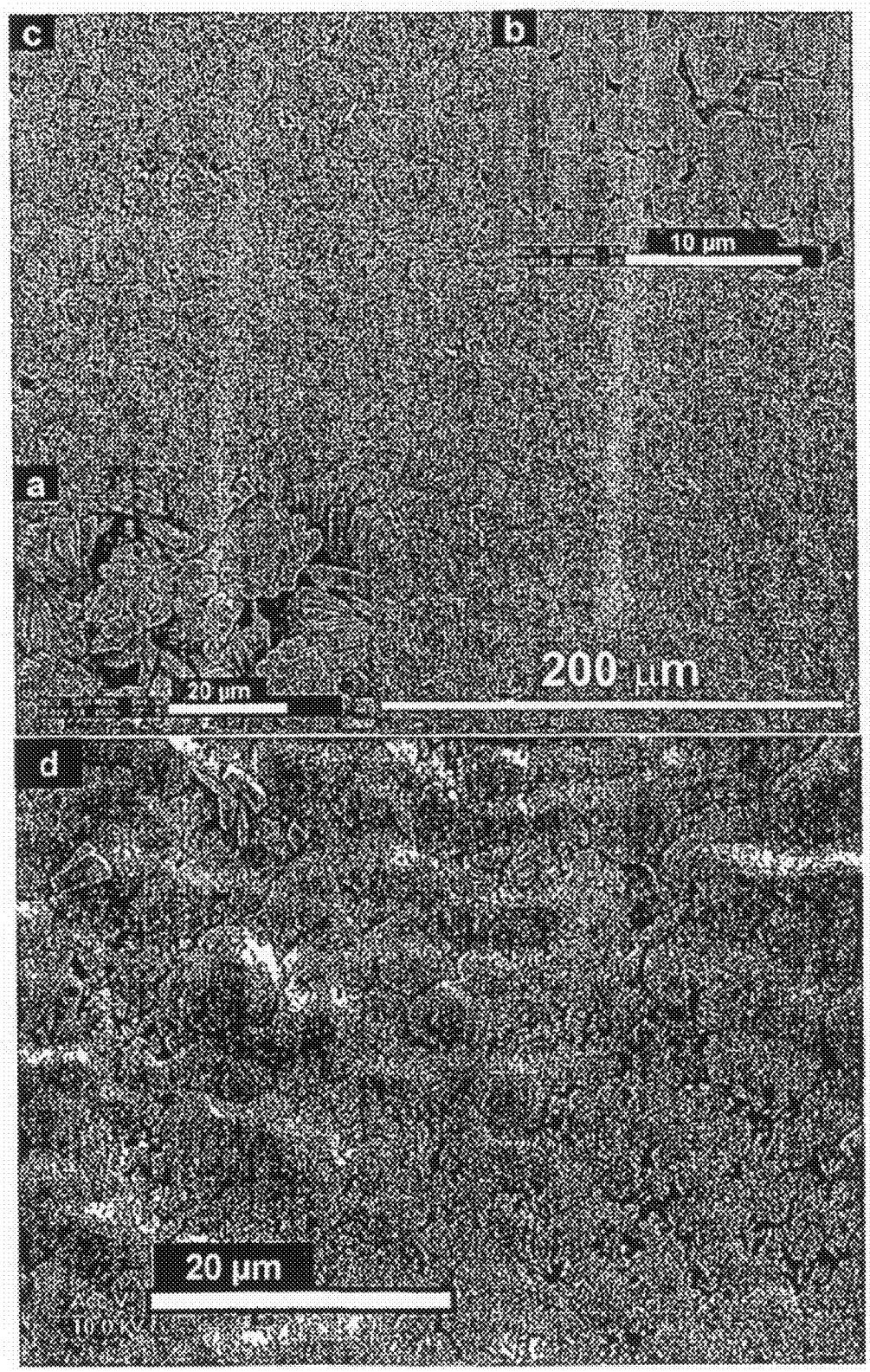
FIG. 14 shows dental enamel-like FA films grown on iron plates where the crystals are aligned over a large area; higher resolution SEM images show that these crystals form bundle (prism-like) structures and are well crystallized, in accordance with still another aspect of the disclosed methods.
Figure 15:
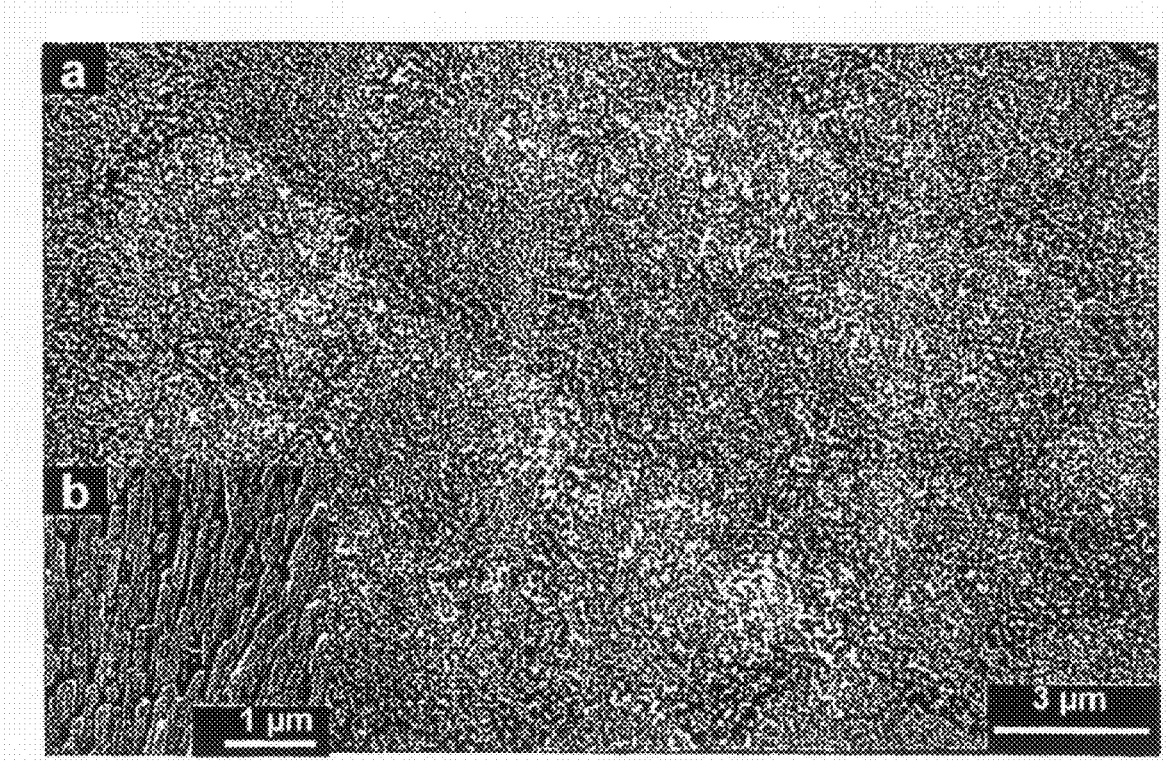
FIG. 15 shows a) a SEM image of the natural surface of human molar enamel which was lightly etched with 37% phosphoric acid; b) a SEM image of human molar enamel which was cut longitudinally with a diamond saw.

Various substrates (iron, titanium, mica, glass, silicon plates) were added to 100 mL newly prepared EDTA-Ca—$Na_2$/$NaH_2PO_4$/NaF mixture and then autoclaved using the liquid cycle at 121° C. at a pressure of 2.37 atm for 10 h. The coated metal plates were rinsed with distilled water and dried in vacuum before SEM analysis. The SEM analysis shows that the crystals were well aligned over a large area after being deposited on the metal surface (FIG. 14). The crystals were well developed and showed the typical hexagonal structure of FA. At lower power in the SEM, the densely deposited FA crystals have a very similar appearance to the etched natural enamel surface (cf FIG. 15).

Example 8

Dental Pulp Stem Cell Attachment and Growth on an FA Surface

Figure 16:
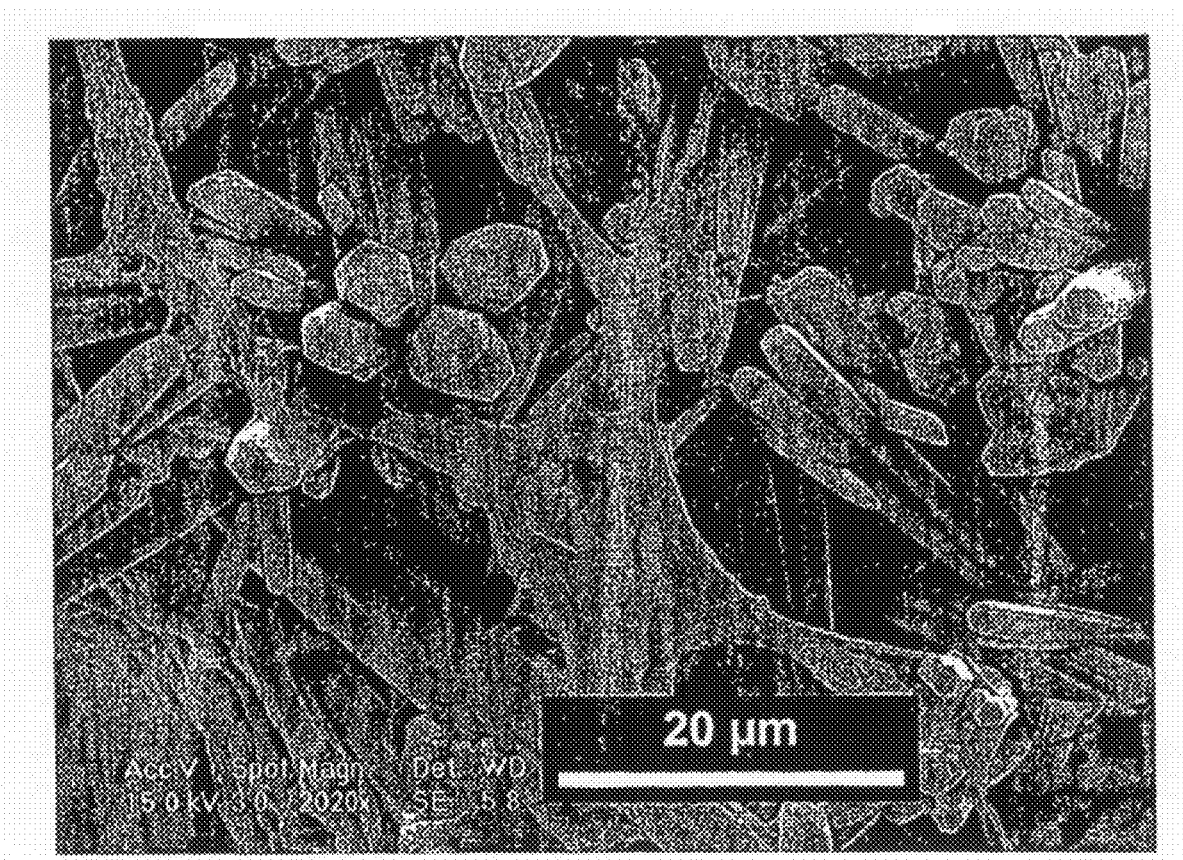
FIG. 16 shows DPSC cells are grown on the FA films and demonstrate that these crystals are biocompatible with living cells, in accordance with another aspect of the disclosed methods.

Similarly, instead of a metal plate, the FA films were prepared as described in Example 7 in the presence of a glass plate. The FA film deposited on the glass surfaces after 10 hours were peeled off, washed, autoclaved, and placed in a PBS solution overnight. The films were stored in 10% fetal bovine serum (FBS) and Dulbecco's modified Eagle's medium (DMEM) before use. DMEM supplemented with 10% FBS, 100 units/mL of penicillin and 100 μg/mL streptomycin were incubated with dental pulp stem cells (DPSC) at passage 8 and dispersed, at a seeding density of $0.8 \times 10^6$, onto 60 mm culture dishes covered with the FA film. The cultures were maintained at 37° C. in a humidified atmosphere containing 5% $CO_2$ and 95% air. The medium and the supplements were changed every other day. The FA films were removed from the culture dishes, fixed in 2.5% glutaraldehyde solution for 30 min, and washed 5 times with distilled water. The fixed FA films were serially dehydrated with 25%, 50%, 75%, 95%, and 100% ethanol for 5 min. The specimens were then dried in air overnight. Unless indicated otherwise, the above steps were all performed at room temperature. FIG. 16 shows the DPSC growth on the FA films and demonstrates that these crystals are biocompatible with living cells.

In summary, the above description sets forth preferred embodiments of the present invention, and is not to be construed as confining the protective scope of the following claims.

What is claimed is:

1. A method of preparing ordered hydroxyapatite nanorod structures comprising:
    suspending or dissolving a calcium source, a phosphate source, and ethylenediaminetetraacetic acid or an ethylenediaminetetraacetic acid derivative in a solvent to form a suspension or a solution;
    adjusting the suspension or solution to a pH in the range of about 6 to about 11; and
    heating the suspension or solution to a temperature in the range of 25° C. to 150° C. at a pressure greater than 1 atm to support formation of the ordered hydroxyapatite nanorod structures,
    wherein the suspension or solution further comprises amelogenin, enamelin, dentin phosphoprotein, collagen, or ameloblastin.

2. The method of claim 1 wherein the calcium source is selected from the group consisting of calcium phosphate, calcium nitrate, calcium ethylenediaminetetraacetate, calcium carbonate, calcium acetate, calcium bromide, calcium fluoride, calcium iodide, calcium chloride, calcium citrate, calcium hydroxide, calcium oxylate, calcium sulfate, calcium ethoxide, and combinations thereof.

3. The method of claim 1 wherein the phosphate source is selected from the group consisting of calcium phosphate, sodium phosphate, ammonium phosphate, lithium phosphate, potassium phosphate, magnesium phosphate, triethyl phosphate, and combinations thereof.

4. The method of claim 1 wherein both the calcium source and the phosphate source comprise powdered hydroxyapatite.

5. The method of claim 1 wherein the solvent is selected from the group consisting of water, methanol, ethanol, nitric acid and combinations thereof.

6. The method of claim 1 wherein the pH of the suspension or solution is adjusted to about 6.

7. The method of claim 1 wherein the temperature is in the range of 70° C. to 130° C.

8. The method of claim 1 wherein the heating persists for a time period in the range of about 5 minutes and about 120 hours.

9. The method of claim 1 wherein the suspension or solution further comprises ammonium fluoride or sodium fluoride to form fluorapatite structures.

10. The method of claim 1 further comprising exposing the suspension or solution to carbon dioxide.

11. The method of claim 10 wherein the carbon dioxide comprises atmospheric carbon dioxide.

12. The method of claim 1 wherein the hydroxyapatite nanorod structures comprise nanorods with a diameter in the range of about 5 nm to about 5 μm and a length in the range of about 10 nm to about 200 μm.

13. A method for producing an enamel film comprising:
    a) suspending or dissolving a calcium source, a phosphate source, and ethylenediaminetetraacetic acid or an ethylenediaminetetraacetic acid derivative in a solvent to form a suspension;
    b) adjusting the suspension or solution to a pH in the range of about 6 to about 11;
    c) adding a substrate to the suspension or solution; and
    d) heating the suspension or solution to a temperature in the range of 25° C. to 150° C. and under a pressure greater than 1 atm to form an enamel film on the substrate, wherein the suspension or solution further comprises amelogenin.

14. The method of claim 13 wherein the substrate is a bone implant, dental implant, or dental restorative material.

15. The method of claim 13 wherein the temperature is in the range of 120° C. to 130° C. and the pressure is above 2 atm.

16. The method of claim 13 wherein the calcium source is selected from the group consisting of calcium phosphate, calcium nitrate, calcium ethylenediaminetetraacetate, calcium carbonate, calcium acetate, calcium bromide, calcium fluoride, calcium iodide, calcium chloride, calcium citrate, calcium hydroxide, calcium oxylate, calcium sulfate, calcium ethoxide, and combinations thereof.

17. The method of claim 13 wherein the phosphate source is selected from the group consisting of calcium phosphate, sodium phosphate, ammonium phosphate, lithium phosphate, potassium phosphate, magnesium phosphate, triethyl phosphate, and combinations thereof.

18. The method of claim 13 wherein both the calcium source and the phosphate source comprise powdered hydroxyapatite.

19. The method of claim 13 wherein the solvent is selected from the group consisting of water, methanol, ethanol, nitric acid and combinations thereof.

20. The method of claim 13 wherein the suspension or solution is adjusted to a pH in the range of 6 to 8.

21. The method of claim 13 wherein the heating persists for a time period in the range of about 10 hours and about 48 hours.

22. The method of claim 13 wherein the suspension or solution further comprises sodium fluoride or ammonium fluoride to form the enamel film comprising fluorapatite.

23. The method of claim 13 further comprising exposing the suspension or solution to carbon dioxide.

24. The method of claim 23 wherein the carbon dioxide comprises atmospheric carbon dioxide.

25. The method of claim 13 wherein the enamel film comprises nanorods with a diameter in the range of about 5 nm to about 5 μm and a length in the range of about 10 nm to about 200 μm.

26. A method of preparing ordered fluorapatite nanorod structures comprising:
   suspending or dissolving a calcium source, a phosphate source, a fluoride source, and ethylenediaminetetraacetic acid or an ethylenediaminetetraacetic acid derivative in a solvent to form a suspension or a solution;
   adjusting the suspension or solution to a pH in the range of about 6 to about 11; and
   heating the suspension or solution to a temperature in the range of 25° C. to 150° C. to support formation of the ordered fluorapatite nanorod structures.

27. The method of claim 26, wherein the calcium source is selected from the group consisting of calcium phosphate, calcium nitrate, calcium ethylenediaminetetraacetate, calcium carbonate, calcium acetate, calcium bromide, calcium fluoride, calcium iodide, calcium chloride, calcium citrate, calcium hydroxide, calcium oxylate, calcium sulfate, calcium ethoxide, and combinations thereof.

28. The method of claim 26, wherein the phosphate source is selected from the group consisting of calcium phosphate, sodium phosphate, ammonium phosphate, lithium phosphate, potassium phosphate, magnesium phosphate, triethyl phosphate, and combinations thereof.

29. The method of claim 26, wherein the fluoride source comprises ammonium fluoride or sodium fluoride.

30. The method of claim 26, further comprising heating the suspension or solution under a pressure greater than 1 atm.

31. The method of claim 26, wherein the temperature is in the range of 70° C. to 130° C.

32. The method of claim 26, wherein the pH of the suspension or solution is about 6.

33. The method of claim 30, wherein the pressure is 2 atm or greater.

* * * * *